(12) United States Patent
Kang et al.

(10) Patent No.: US 10,432,341 B2
(45) Date of Patent: Oct. 1, 2019

(54) TRANSMITTER FOR TRANSMITTING OPTICAL SIGNAL IN OPTICAL COMMUNICATION SYSTEM AND METHOD OF OPERATING THE SAME

(71) Applicant: ELECTRONICS AND TELECOMMUNICATIONS RESEARCH INSTITUTE, Daejeon (KR)

(72) Inventors: Sae Kyoung Kang, Daejeon (KR); Joon Ki Lee, Daejeon (KR); Joon Young Huh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/033,330

(22) Filed: Jul. 12, 2018

(65) Prior Publication Data

US 2019/0020438 A1 Jan. 17, 2019

(30) Foreign Application Priority Data

Jul. 12, 2017 (KR) ........................ 10-2017-0088584
Nov. 9, 2017 (KR) ........................ 10-2017-0148938

(51) Int. Cl.
  *H04B 10/077* (2013.01)
  *H04B 11/00* (2006.01)
  (Continued)

(52) U.S. Cl.
  CPC ...... *H04J 14/0283* (2013.01); *H04B 10/0779* (2013.01); *H04J 14/022* (2013.01);
  (Continued)

(58) Field of Classification Search
  CPC .............. H04B 10/0779; H04J 14/0283; H04J 14/022; H04Q 11/0062; H04Q 2011/0083; H04Q 2011/0088; H04Q 2011/0092
  (Continued)

(56) References Cited

U.S. PATENT DOCUMENTS 5,329,392 A  7/1994  Cohen
5,894,362 A * 4/1999  Onaka ................. H04B 10/077
                                                         398/34

(Continued)

FOREIGN PATENT DOCUMENTS

EP       3012984 B1    9/2017
JP       5053121 B2   10/2012
KR  10-2016-0002266 A  1/2016

OTHER PUBLICATIONS

Takaharu Ohyama et al., "Compact Hybrid-Integrated 100-Gbs TOSA Using EADFB Laser Array and AWG Multiplexer", IEEE Photonics Technology Letters, vol. 28, No. 7, Apr. 1, 2016.

*Primary Examiner* — Dalzid E Singh
(74) *Attorney, Agent, or Firm* — LRK Patent Law Firm

(57) ABSTRACT

A transmitter for transmitting an optical signal in an optical communication system includes a plurality of light sources configured to output optical signals; a plurality of first optical couplers configured to multiplex the optical signals, which are output from the plurality of light sources, to generate a first optical signal, and output the first optical signal through a first output port and a second output port of each of the plurality of first optical couplers; a first monitoring unit configured to monitor the first optical signal which is output through the second output port of each of the plurality of first optical couplers; and a controller configured to control an optical output of each of the plurality of light sources on the basis of a result of the monitoring.

15 Claims, 10 Drawing Sheets

(51) Int. Cl.
*H04J 14/02* (2006.01)
*H04Q 11/00* (2006.01)

(52) U.S. Cl.
CPC . *H04Q 11/0062* (2013.01); *H04Q 2011/0083* (2013.01); *H04Q 2011/0088* (2013.01); *H04Q 2011/0092* (2013.01)

(58) Field of Classification Search
USPC .......................................................... 398/59
See application file for complete search history.

(56) References Cited

U.S. PATENT DOCUMENTS

| | | | |
|---|---|---|---|
| 6,396,603 B1 | 5/2002 | Kim | |
| 6,522,436 B2 | 2/2003 | Roberts et al. | |
| 6,928,243 B2 | 8/2005 | Youn et al. | |
| 8,306,419 B2 | 11/2012 | Luk et al. | |
| 8,886,036 B2 | 11/2014 | Jeong et al. | |
| 9,479,259 B2 | 10/2016 | Ho et al. | |
| 2002/0041414 A1* | 4/2002 | Oguma | H04B 10/07957 398/87 |
| 2004/0223710 A1* | 11/2004 | Bhowmik | G02F 1/365 385/122 |
| 2013/0251362 A1 | 9/2013 | Li et al. | |
| 2015/0078758 A1* | 3/2015 | Lee | H04B 10/40 398/135 |
| 2016/0043799 A1* | 2/2016 | Zheng | H04B 10/07955 398/38 |
| 2017/0322381 A1* | 11/2017 | Saeki | G02B 6/32 |
| 2018/0123695 A1* | 5/2018 | Kubota | G02B 6/4206 |

\* cited by examiner

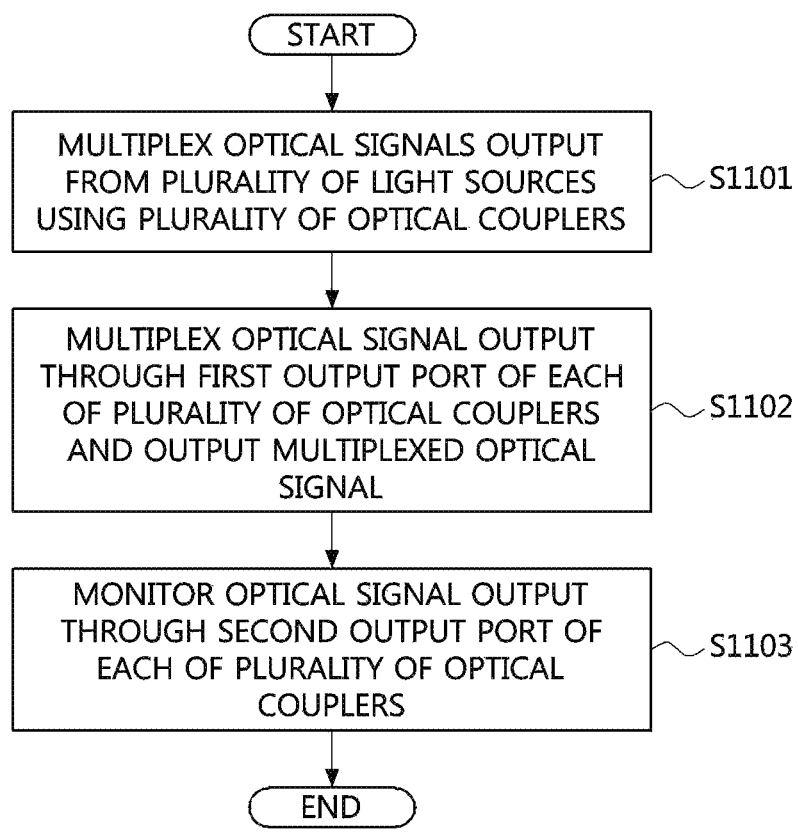

TRANSMITTER FOR TRANSMITTING OPTICAL SIGNAL IN OPTICAL COMMUNICATION SYSTEM AND METHOD OF OPERATING THE SAME

CROSS-REFERENCE TO RELATED APPLICATIONS

This application claims priority to Korean Patent Application No. 10-2017-0088584, filed Jul. 12, 2017, and Korean Patent Application No. 10-2017-0148938, filed Nov. 9, 2017, in the Korean Intellectual Property Office (KIPO), the entire contents of which are hereby incorporated by reference.

BACKGROUND

1. Technical Field

Example embodiments of the present invention relate to an optical communication system, and more specifically, to a transmitter for transmitting an optical signal in an optical communication system and a method of operating the same.

2. Description of Related Art

In a wavelength-division multiplexing optical communication system, an optical transmission unit includes a light source (a laser diode (LD)) having a plurality of wavelengths, an optical multiplexer for integrating optical signals of the wavelengths into one optical signal, a light source driving amplifier or a modulator driving amplifier, and the like. The driving amplifiers are located inside or outside the optical transmission unit according to a driving characteristic and a module structure of the light source used in the optical transmission unit. A method of multiplexing optical signals using a planar lightwave circuit (PLC) and a method of multiplexing optical signals using a thin film filter are mainly used for the optical multiplexer. Generally, a PLC-based optical multiplexer is implemented in the form of an arrayed waveguide grating (AWG), and a pure AWG has a characteristic that a wavelength pass band varies according to temperature. Therefore, the PLC-based optical multiplexer has a problem in that there are a method of compensating for temperature when a PLC chip is implemented and a structure of compensating for temperature by physically dividing a free propagation region (FPR) of an AWG.

SUMMARY

Accordingly, example embodiments of the present invention are provided to substantially obviate one or more problems due to limitations and disadvantages of the related art.

Example embodiments of the present invention provide a transmitting device and method for multiplexing and monitoring a plurality of optical signals which are input through a plurality of channels in an optical communication system.

Example embodiments of the present invention also provide a transmitting device and method for providing an accuracy of a central wavelength of a plurality of light sources which output a plurality of optical signals through a plurality of channels in an optical communication system.

Example embodiments of the present invention also provide a transmitting device which may be insensitive to the temperature dependency of an optical multiplexer in an optical communication system and may efficiently monitor a plurality of optical signals which are input or output through a plurality of channels.

In some example embodiments, a transmitter for transmitting an optical signal in an optical communication system is disclosed. The transmitter includes a plurality of light sources configured to output optical signals, a plurality of first optical couplers configured to multiplex the optical signals, which are output from the plurality of light sources, to generate a first optical signal, and output the first optical signal through a first output port and a second output port of each of the plurality of first optical couplers, a first monitoring unit configured to monitor the first optical signal which is output through the second output port of each of the plurality of first optical couplers, and a controller configured to control an optical output of each of the plurality of light sources on the basis of a result of the monitoring.

The first monitoring unit may include a plurality of monitoring light receiving elements configured to monitor the first optical signal. Each of the plurality of monitoring light receiving elements may be connected to the second output port of each of the plurality of first optical couplers.

The transmitter may further include a second optical coupler configured to multiplex the first optical signal, which is output through the first output port of each of the plurality of first optical couplers, to generate a second optical signal.

The second optical coupler may output the second optical signal through a first output port and a second output port of the second optical coupler.

The transmitter may further include at least one monitoring light receiving element configured to monitor the second optical signal which is output through the second output port of the second optical coupler. The at least one monitoring light receiving element may be connected to the second output port of the second optical coupler.

The second optical coupler may be an optical coupling lens. The optical coupling lens may multiplex the first optical signal to generate a second optical signal.

The first monitoring unit may include a plurality of optical ring resonators and a plurality of monitoring light receiving elements. Each of the plurality of optical ring resonators may filter the first optical signal, which is output through the second output port of each of the plurality of first optical couplers, for each wavelength. Each of the plurality of monitoring light receiving elements may monitor the first optical signal filtered using each of the plurality of optical ring resonators.

The transmitter may further include a planar lightwave circuit substrate on which the plurality of first optical couplers, the second optical coupler, and the first monitoring unit are mounted.

In other example embodiments, a method of operating a transmitter for transmitting an optical signal in an optical communication system is disclosed. The method of operating the transmitter includes multiplexing optical signals which are output from a plurality of light sources using each of a plurality of first optical couplers to generate a first optical signal, outputting the first optical signal through a first output port and a second output port of each of the plurality of first optical couplers; monitoring the first optical signal which is output through the second output port of each of the plurality of first optical couplers, and controlling an optical output of each of the plurality of light sources on the basis of a result of the monitoring.

The first optical signal may be monitored using a plurality of monitoring light receiving elements connected to the second output port of each of the plurality of first optical couplers.

The method of operating the transmitter may further include multiplexing the first optical signal, which is output through the first output port of each of the plurality of first optical couplers, using a second optical coupler to generating a second optical signal.

The method of operating the transmitter may further include outputting the second optical signal through a first output port and a second output port of the second optical coupler.

The method of operating the transmitter may further include monitoring the second optical signal which is output through the second output port of the second optical coupler. The second optical signal may be monitored using at least one monitoring light receiving element connected to the second output port of the second optical coupler.

The method of operating the transmitter may further include multiplexing the first optical signal, which is output through the first output port of each of the plurality of first optical couplers, using at least one optical coupling lens to generate a second optical signal.

The method of operating the transmitter may further include filtering the first optical signal, which is output through the first output port of each of the plurality of first optical couplers, using each of a plurality of optical ring resonators for each wavelength.

The method of operating the transmitter may further include monitoring the first optical signal, which is filtered using each of the plurality of optical ring resonators, using each of a plurality of monitoring light receiving elements.

BRIEF DESCRIPTION OF DRAWINGS

Example embodiments of the present invention will become more apparent by describing example embodiments of the present invention in detail with reference to the accompanying drawings, in which:

FIG. 11 is a flowchart showing a sequence of operations of a transmitter according to a sixth example embodiment.

DETAILED DESCRIPTION OF EXAMPLE EMBODIMENTS

Figure 1:
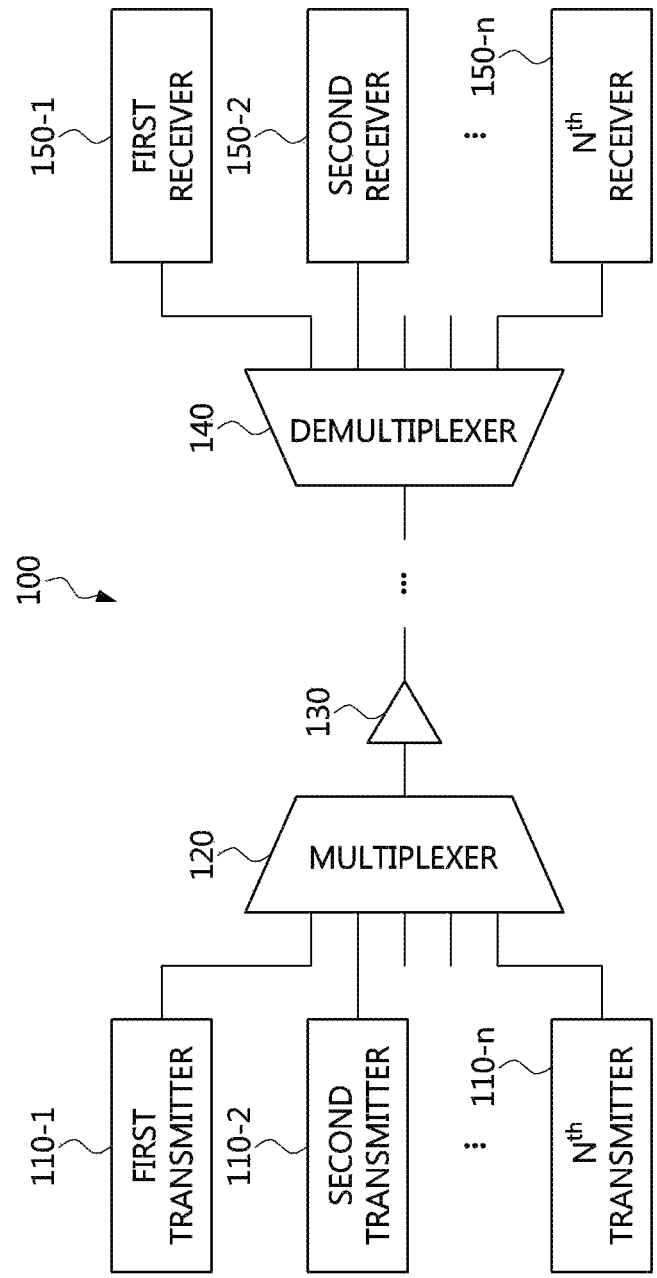
FIG. 1 is a conceptual diagram showing an optical communication system according to a first example embodiment.

While the present invention may be modified in various ways and take on various alternative forms, example of specific embodiments thereof are shown in the accompanying drawings and described in detail below. There is no intent to limit the example embodiments of the present invention to the particular forms disclosed. On the contrary, the present invention is to cover all modifications, equivalents, and alternatives falling within the spirit and scope of the present invention.

It will be understood that, although the terms first, second, etc. may be used herein to describe various elements, these elements should not be limited by these terms. These terms are only used to distinguish one element from another element. For example, a first element could be termed a second element, and, similarly, a second element could be termed a first element, without departing from the scope of the present invention. As used herein, the term "and/or" includes any one or combinations of the associated listed items.

It will be understood that when an element is referred to as being "connected" or "coupled" to another element, it can be directly connected or coupled to another element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present invention. As used herein, the singular forms "a," "an," and "the" are intended to include the plural forms as well, unless the context clearly indicates otherwise. It should be further understood that the terms "comprise," "comprising," "include," and/or "including," when used herein, specify the presence of stated features, integers, steps, operations, elements, parts, or combinations thereof, but do not preclude the presence or addition of one or more other features, integers, steps, operations, elements, parts, or combinations thereof.

Unless otherwise defined, all terms (including technical and scientific terms) used herein have the same meaning as commonly understood by one of ordinary skill in the art to which the present invention belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in detail with reference to the accompanying drawings. In order to facilitate overall understanding of the present invention, like reference numerals in the drawings denote like elements, and thus the description thereof will not be repeated.

FIG. 1 is a conceptual diagram showing an optical communication system according to a first example embodiment.

Referring to FIG. 1, an optical communication system 100 according to the first example embodiment may be an optical transmission system of a wavelength-division multiplexing (WDM) transmission method. The WDM transmission method refers to a method of converting a plurality of wavelength signals into one multiplexed signal and transmitting the multiplexed signal through one optical fiber. The WDM transmission method may be utilized not only in broadband transmission networks but also in fields of short-distance Ethernet transmission. For example, in the WDM transmission method, signals passing through high-capacity Ethernet may be transmitted through a single mode optical fiber or a multi-mode optical fiber.

The optical communication system 100 may include an optical transmission unit and an optical reception unit. The optical transmission unit may include a plurality of transmitters, a multiplexer (MUX), and an amplifier. For example, the optical transmission unit may include first to $n^{th}$ transmitters 110-1 to 110-$n$, a MUX 120, and an amplifier 130. Each of the first to $n^{th}$ transmitters 110-1 to 110-$n$ may include a light source (not shown) for converting an electrical signal into an optical signal. Each of the first to $n^{th}$ transmitters 110-1 to 110-$n$ may convert an electrical signal into an optical signal using the light source thereof. The first to $n^{th}$ transmitters 110-1 to 110-$n$ may transmit optical signals to the MUX 120 through optical channels.

The MUX 120 may receive a plurality of optical signals having a plurality of wavelengths from the first to $n^{th}$ transmitters 110-1 to 110-$n$. The MUX 120 may wavelength-division-multiplex a plurality of optical signals into one optical signal. The MUX 120 may transmit the multiplexed optical signal to the optical reception unit through an optical fiber.

The MUX 120 may include an arrayed waveguide grating (AWG) filter (not shown) or a thin film filter (not shown). The MUX 120 may multiplex optical signals using the AWG filter or the thin film filter. The MUX 120 may have a structure in which an AWG filter is mounted on a planar lightwave circuit (PLC) substrate. In this case, the AWG filter may have a characteristic in which a wavelength pass band varies according to temperature. The MUX 120 may have a separate temperature control device (not shown) which is additionally mounted on the PLC substrate to control the temperature of the AWG filter. Further, the MUX 120 may use an AWG filter from which a free propagation region (FPR) is physically removed to control the temperature of the AWG filter.

The amplifier 130 may amplify the multiplexed optical signal. The amplifier 130 may be located inside or outside the optical transmission unit according to a driving characteristic and a module structure of the light source used in the optical transmission unit.

The optical reception unit may receive the multiplexed optical signal through an optical fiber. The optical reception unit may include a demultiplexer (DEMUX) and a plurality of receivers. For example, the optical reception unit may include a DEMUX 140 and first to $n^{th}$ receivers 150-1 to 150-$n$.

For example, the DEMUX 140 may receive the multiplexed optical signal from the MUX 120 through the optical fiber. The DEMUX 140 may demultiplex the received optical signal having a plurality of wavelengths. The DEMUX 140 may separate the multiplexed optical signal for each wavelength and transmit the separated optical signals to the first to $n^{th}$ receivers 150-1 to 150-$n$ through respective channels.

Each of the first to $n^{th}$ receivers 150-1 to 150-$n$ may include a photodiode (PD) (not shown) and a transimpedance amplifier (TIA) (not shown). Each of the first to $n^{th}$ receivers 150-1 to 150-$n$ may convert an optical signal into an electrical signal using the PDs and amplify and output the electrical signal using the TIAs.

In FIG. 1, one MUX 120, one amplifier 130, and one DEMUX 140 are shown for convenience of description. However, a plurality of MUXs 120, a plurality of amplifiers 330, and a plurality of DEMUXs 140 may be provided.

Figure 2:
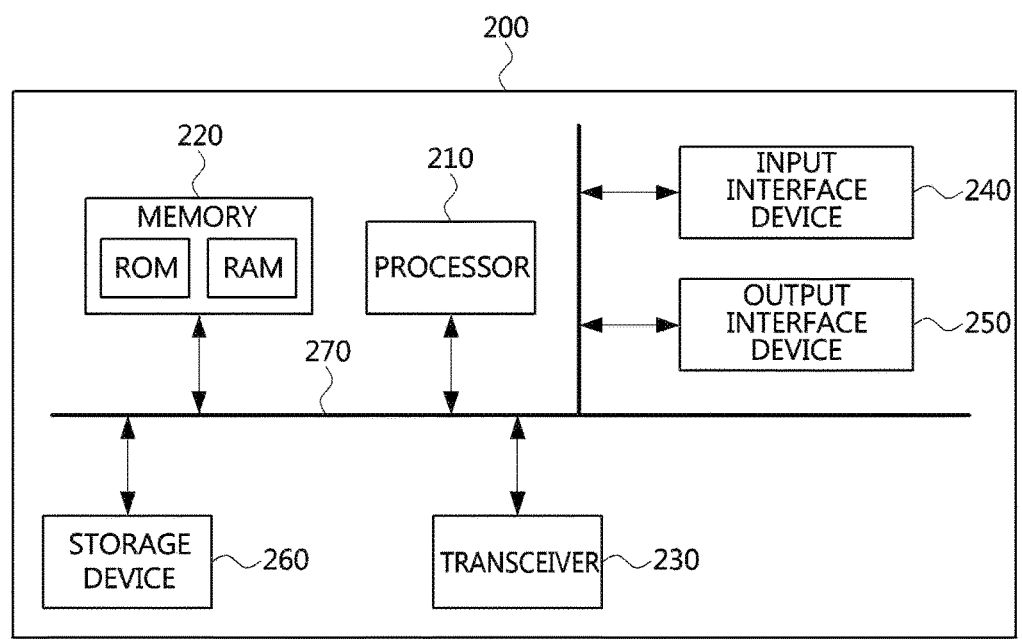
FIG. 2 is a block diagram showing a communication node in a communication system according to the first example embodiment.

FIG. 2 is a block diagram showing a communication node in a communication system according to the first example embodiment.

Referring to FIG. 2, a communication node 200 may include at least one processor 210, a memory 220, and a transceiver 230 which is connected to a network to perform communication. Further, the communication node 200 may further include an input interface device 240, an output interface device 250, a storage device 260, and the like. The components included in the communication node 200 may be connected through a bus 270 and may communicate with each other.

The processor 210 may execute a program command stored in at least one of the memory 220 and the storage device 260. The processor 210 may refer to a central processing unit (CPU), a graphics processing unit (GPU), or a dedicated processor by which methods according to the example embodiments of the present invention are performed. Each of the memory 220 and the storage device 260 may be formed as at least one of a volatile storage medium and a non-volatile storage medium. For example, the memory 220 may be formed as at least one of a read only memory (ROM) and a random access memory (RAM).

The transceiver 230 which transmits an optical signal in the communication node may operate as a transmitter for transmitting an optical signal. Further, the transceiver 230 which receives an optical signal in the communication node may operate as a receiver for receiving an optical signal.

For example, the communication node 200 may transmit an optical signal. In this case, at least one command to be executed by the processor 210 may be stored in the memory 220. For example, at least one command may be executed such that optical signals which are output from a plurality of light sources (not shown) are multiplexed using a plurality of optical couplers (not shown), optical signals which are output through respective first output ports (not shown) of the plurality of optical couplers are multiplexed and output, optical signals which are output through respective second output ports (not shown) of the plurality of optical couplers are monitored, and optical outputs of the plurality of light sources are controlled on the basis of the monitored result.

Figure 3:
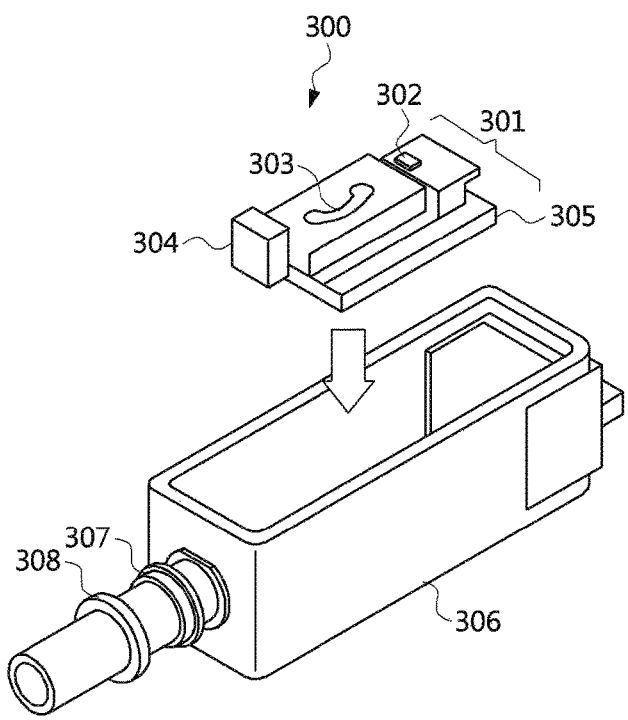
FIG. 3 is a conceptual diagram showing a transmitter according to a second example embodiment.

FIG. 3 is a conceptual diagram showing a transmitter according to a second example embodiment.

Referring to FIG. 3, a transmitter 300 may include a PLC substrate 301, a 4-channel laser array 302, an AWG MUX 303, a collimator 304, a thermoelectric cooler (TEC) 305, a main body 306, a focusing lens 307, and an isolator 308.

The 4-channel laser array 302 may be mounted on the PLC substrate 301. The 4-channel laser array 302 may be mounted on an upper portion of the PLC substrate 301. The 4-channel laser array 302 may output a plurality of optical signals.

The AWG MUX 303 may multiplex the plurality of optical signals which are output from the 4-channel laser array 302. The AWG MUX 303 may transmit the multiplexed optical signal to the collimator 304.

The collimator 304 may collimate the multiplexed optical signal received from the AWG MUX 303. The collimator 304 may transmit the collimated optical signal to the focusing lens 307.

The TEC 305 may be mounted below the PLC substrate 301. The AWG MUX 303 may change a wavelength pass band of an optical signal according to temperature. The TEC 305 may control the temperature of the AWG MUX 303.

The components of the transmitter 300 may be mounted on the main body 306. For example, the PLC substrate 301, the 4-channel laser array 302, the AWG MUX 303, the collimator 304, and the TEC 305 may be mounted on the main body 306.

The focusing lens 307 may be disposed on a portion of the main body 306. The focusing lens 307 may receive the collimated optical signal from the collimator 304. The focusing lens 307 may focus the collimated optical signal and transmit the focused optical signal to a transmitter (not shown) through an optical channel.

The isolator 308 may be disposed on one end of the focusing lens 307. The isolator 308 may control an optical signal to be output in a forward direction.

Figure 4:
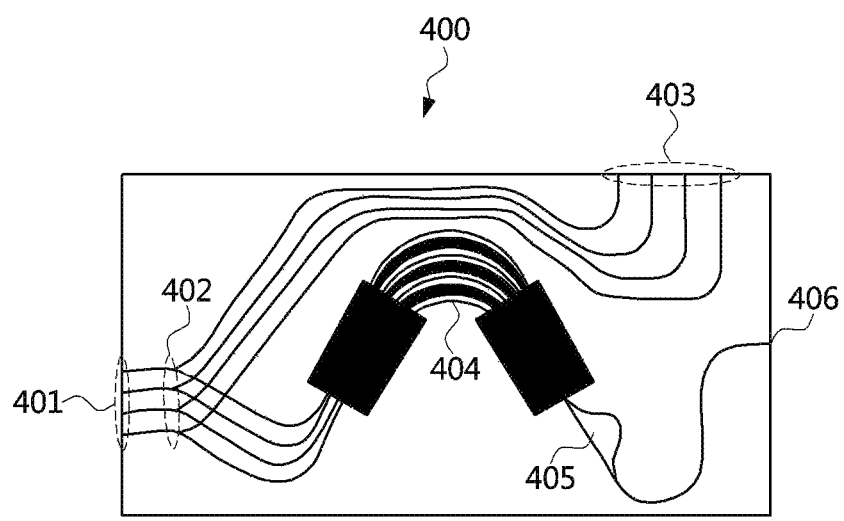
FIG. 4 is a conceptual diagram showing an arrayed waveguide grating multiplexer of the transmitter according to the second example embodiment.

FIG. 4 is a conceptual diagram showing an AWG MUX of the transmitter according to the second example embodiment.

Referring to FIG. 4, an AWG MUX 400 may operate in an identical or similar manner to the operation of the AWG MUX 303 of FIG. 3. The AWG MUX 400 may include a plurality of input ports 401, taps 402, monitoring output ports 403, an AWG 404, a Mach-Zehnder interferometer (MZI) 405, and an output port 406.

The AWG MUX 400 may receive a plurality of optical signals from a plurality of light sources through the plurality of input ports 401. The AWG MUX 400 may transmit the plurality of the received optical signals to the monitoring output ports 403 and the AWG 404 through the taps 402.

The monitoring output ports 403 may receive the plurality of optical signals through the taps 402. The AWG MUX 400 may transmit the plurality of optical signals to monitoring PDs (MPDs) (not shown) through the monitoring output ports 403. The MPDs may monitor the plurality of optical signals.

The AWG 404 may receive the plurality of optical signals through the taps 402. The AWG 404 may multiplex the plurality of optical signals. The AWG 404 may transmit the multiplexed optical signal to the output port 406.

The MZI 405 may be one type of temperature sensor. The MZI 405 may sense temperature on the basis of an optical signal passing through a waveguide. For example, the MZI 405 may be connected to one end of the AWG 404 and one end of the output port 406. The MZI 405 may sense the temperature of the AWG MUX 400 using an optical signal which is output from the one end of the AWG 404. The AWG 404 may output the multiplexed optical signal to an optical output interface (not shown) through the output port 406.

Figure 5:
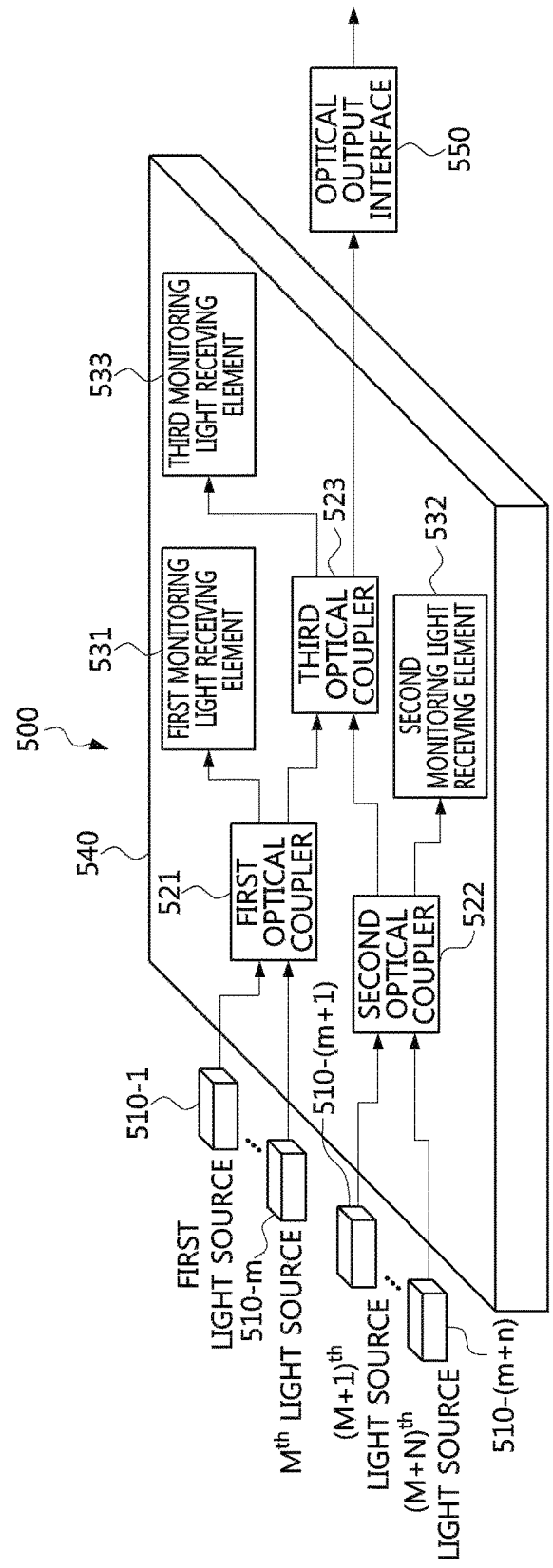
FIG. 5 is a block diagram showing a structure of a transmitter according to a third example embodiment.

FIG. 5 is a block diagram showing a structure of a transmitter according to a third example embodiment.

Referring to FIG. 5, a transmitter 500 may include a plurality of light sources 510-1 to 510-($m$+n), a plurality of optical couplers 521 to 523, a plurality of monitoring light receiving elements 531 to 533, a substrate 540, and an optical output interface 550.

Each of the plurality of light sources 510-1 to 510-($m$+n) may convert an electrical signal into an optical signal. Each of the plurality of light sources 510-1 to 510-($m$+n) may convert a received electrical signal into an optical signal and output the optical signal. For example, each of the plurality of light sources 510-1 to 510-($m$+n) may include a PD.

The plurality of light sources 510-1 to 510-($m$+n) may be connected to the optical couplers. For example, the first to $m^{th}$ light sources 510-1 to 510-$m$ may be connected to a first optical coupler 521. Further, the (m+1)$^{th}$ (m+n)$^{th}$ light sources 510-($m$+1) to 510-($m$+n) may be connected to a second optical coupler 522.

Each of the plurality of optical couplers 521 to 523 may receive a plurality of optical signals and combine the plurality of optical signals into one optical signal. Each of the plurality of optical couplers 521 to 523 may include an optical splitter or a multi-mode interference (MMI). For example, each of the plurality of optical couplers 521 to 523 may have various structures of input and output ports such as 2×1 ports, 2×2 ports, 4×4 ports, n×m ports, and the like. Here, m and n may have the same positive integer value or different positive integer values.

Each of the plurality of optical couplers 521 to 523 may be connected to a plurality of light sources, a monitoring light receiving element, and another optical coupler. For example, the first optical coupler 521 may be connected to the first to m$^{th}$ light sources 510-1 to 510-$m$, a first monitoring light receiving element 531, and a third optical coupler 523. Further, the second optical coupler 522 may be connected to the (m+1)$^{th}$ to (m+n)$^{th}$ light sources 510-($m$+1) to 510-($m$+n), a second monitoring light receiving element 532, and the third optical coupler 523.

Each of the plurality of monitoring light receiving elements 531 to 533 may monitor an optical signal. For example, each of the plurality of monitoring light receiving elements 531 to 533 may detect an optical signal which is output from the optical coupler. Each of the plurality of monitoring light receiving elements 531 to 533 may include a monitor PD.

The substrate 540 may be a PLC substrate or a silicon substrate. The plurality of optical couplers 521 to 523 and the plurality of monitoring light receiving elements 531 to 533 may be mounted on the substrate 540. That is, the plurality of optical couplers 521 to 523 and the plurality of monitoring light receiving elements 531 to 533 may be mounted on an upper surface or a lower surface of the substrate 540.

The first optical coupler 521 may include a plurality of input ports (not shown) and a plurality of output ports (not shown). For example, the first optical coupler 521 may include first to m$^{th}$ input ports (not shown). The first input port of the first optical coupler 521 may be connected to the first light source 510-1. The m$^{th}$ input port of the first optical coupler 521 may be connected to the m$^{th}$ light source 510-$m$.

The first optical coupler 521 may include a first output port (not shown) and a second output port (not shown). The first output port of the first optical coupler 521 may be connected to the first monitoring light receiving element 531. The second output port of the first optical coupler 521 may be connected to the third optical coupler 523.

The first optical coupler 521 may receive optical signals from the plurality of light sources through the plurality of input ports. The first optical coupler 521 may receive first to m$^{th}$ optical signals, which are output from the first to m$^{th}$ light sources 510-1 to 510-$m$, through the first to m$^{th}$ input ports.

For example, the first optical coupler 521 may receive an optical signal from the first light source 510-1 through the first input port. Further, the first optical coupler 521 may receive an optical signal from the m$^{th}$ light source 510-$m$ through the m$^{th}$ input port. The first optical coupler 521 may multiplex the first to m$^{th}$ optical signals into one optical signal. That is, the first optical coupler 521 may output the multiplexed optical signal.

The first optical coupler 521 may transmit the multiplexed optical signal to the first monitoring light receiving element 531 through the first output port. The first monitoring light receiving element 531 may detect the optical signal which is output through the first output port of the first optical coupler 521. Further, the first optical coupler 521 may transmit the multiplexed optical signal to the third optical coupler 523 through the second output port.

The second optical coupler 522 may include a plurality of input ports (not shown) and a plurality of output ports (not shown). For example, the second optical coupler 522 may include $(m+1)^{th}$ to $(m+n)^{th}$ input ports (not shown). The $(m+1)^{th}$ input port of the second optical coupler 522 may be connected to the $(m+1)^{th}$ light source 510-($m$+1). The (m+n)$^{th}$ input port of the second optical coupler 522 may be connected to the $(m+n)^{th}$ source 510-($m$+n).

The second optical coupler 522 may include a first output port (not shown) and a second output port (not shown). The first output port of the second optical coupler 522 may be connected to the second monitoring light receiving element 532. The second output port of the second optical coupler 522 may be connected to the third optical coupler 523.

The second optical coupler 522 may receive optical signals from the plurality of light sources through the plurality of input ports. The second optical coupler 522 may receive $(m+1)^{th}$ to $(m+n)^{th}$ optical signals, which are output from the $(m+1)^{th}$ to $(m+n)^{th}$ light sources 510-($m$+1) to 510-($m$+n), through the $(m+1)^{th}$ to $(m+n)^{th}$ input ports.

For example, the second optical coupler 522 may receive an optical signal from the $(m+1)^{th}$ light source 510-($m$+1) through the first input port. Further, the second optical coupler 522 may receive an optical signal from the $(m+n)^{th}$ light source 510-($m$+n) through the $(m+n)^{th}$ input port. The second optical coupler 522 may multiplex the $(m+1)^{th}$ to $(m+n)^{th}$ optical signals into one optical signal. That is, the second optical coupler 522 may output the multiplexed optical signal.

The second optical coupler 522 may transmit the multiplexed optical signal to the second monitoring light receiving element 532 through the first output port. The second monitoring light receiving element 532 may detect the optical signal which is output through the first output port of the second optical coupler 522. Further, the second optical coupler 522 may transmit the multiplexed optical signal to the third optical coupler 523 through the second output port.

The third optical coupler 523 may include a plurality of input ports (not shown) and a plurality of output ports (not shown). For example, the third optical coupler 523 may include a first input port (not shown) and a second input port (not shown). The first input port of the third optical coupler 523 may be connected to the second output port of the first optical coupler 521. The second input port of the third optical coupler 523 may be connected to the second output port of the second optical coupler 522.

The third optical coupler 523 may include a first output port (not shown) and a second output port (not shown). The first output port of the third optical coupler 523 may be connected to a third monitoring light receiving element 533. The second output port of the third optical coupler 523 may be connected to the optical output interface 550.

The third optical coupler 523 may receive the optical signals from the plurality of optical couplers through the plurality of input ports. For example, the third optical coupler 523 may receive the optical signal, which is output from the second output port of the first optical coupler 521, through the first input port. Further, the third optical coupler 523 may receive the optical signal, which is output from the second output port of the second optical coupler 522, through the second input port. The third optical coupler 523 may multiplex the optical signal received from the first optical coupler 521 and the optical signal received from the second optical coupler 522 into one optical signal.

The third optical coupler 523 may output the multiplexed optical signal to the third monitoring light receiving element 533 through the first output port. The third monitoring light receiving element 533 may detect the optical signal which is output through the first output port of the third optical coupler 523. The third optical coupler 523 may output the multiplexed optical signal to the optical output interface 550 through the second output port.

The optical output interface 550 may include an input port (not shown) and an output port (not shown). The optical output interface 550 may output the optical signal, which is received through the input port, through the output port.

The first optical coupler 521 and the second optical coupler 522 may be referred to as a first optical coupling unit. The first monitoring light receiving element 531 and the second monitoring light receiving element 532 may be referred to as a monitoring unit or a first monitoring unit. The third optical coupler 523 may be referred to as a second optical coupling unit. The third monitoring light receiving element 533 may be referred to as a monitoring unit or a second monitoring unit.

In FIG. 5, three optical couplers 521 to 523, three monitoring light receiving elements 531 to 533, and one optical output interface 550 are shown for convenience of description. However, two or less optical couplers or more than three optical couplers may be provided. Further, two or less monitoring light receiving elements or more than three monitoring light receiving elements may be provided. Further, a plurality of optical output interfaces may be provided.

Figure 6:
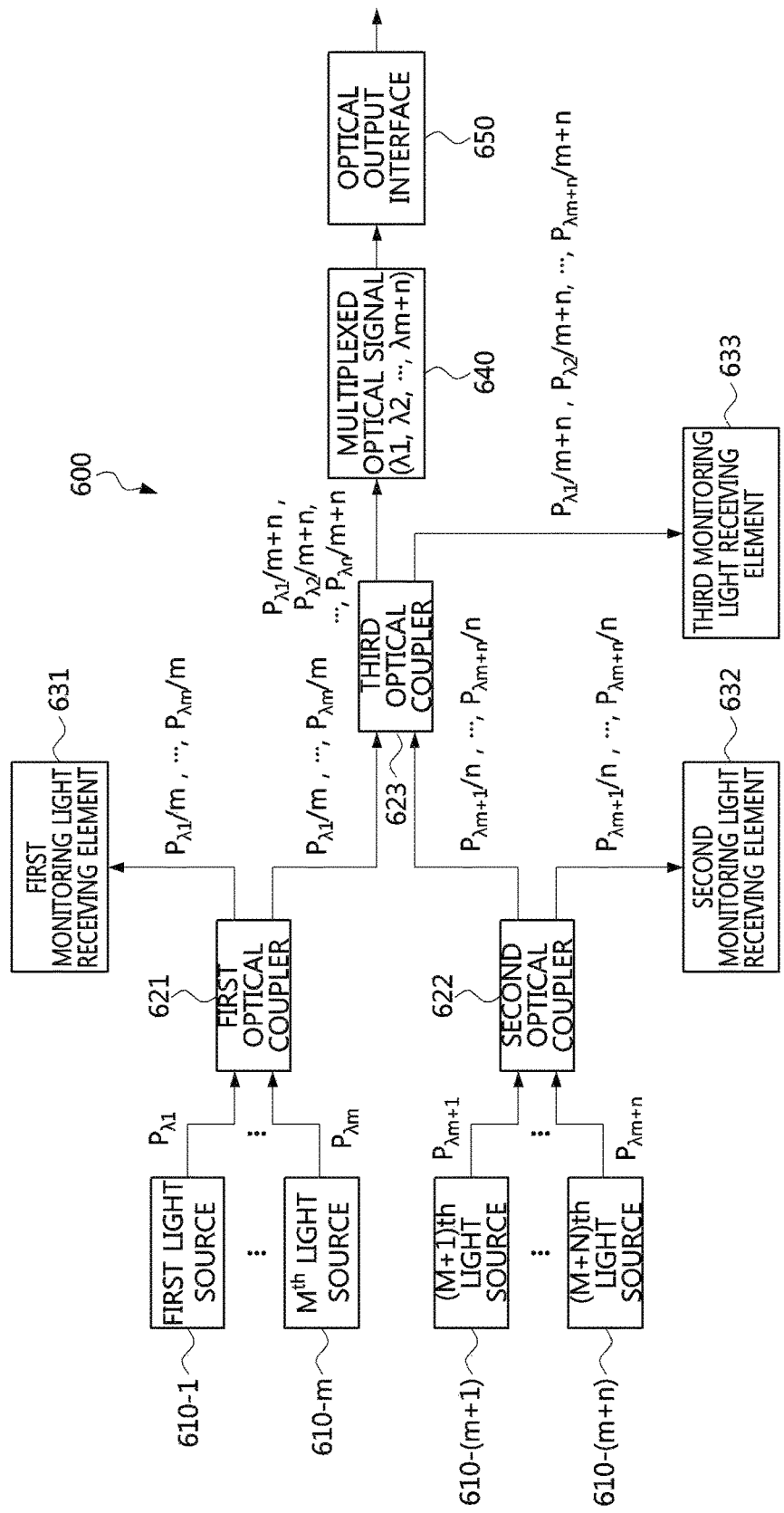
FIG. 6 is a conceptual diagram showing a signal flow of a transmitter according to the third example embodiment.

FIG. 6 is a conceptual diagram showing a signal flow of a transmitter according to the third example embodiment.

Referring to FIG. 6, a transmitter 600 may include a plurality of light sources 610-1 to 610-($m$+n), a plurality of optical couplers 621 to 623, a plurality of monitoring light receiving elements 631 to 633, and an optical output interface 650. The transmitter 600 may operate in an identical or similar manner to the operation of the transmitter 500 of FIG. 5. That is, components of the transmitter 600 may operate in an identical or similar manner to the operations of the components of the transmitter 500 of FIG. 5.

The plurality of optical couplers 621 to 623 may have a structure of n×n input and output ports. In this case, each of the plurality of optical couplers 621 to 623 may have an optical input loss of 10×log(l/n) decibel (dB) per input port.

For example, a first optical coupler 621 may include m input ports. A second optical coupler 622 may include n input ports. Here, m and n may be the same integer or different integers. The first optical coupler 621 and the second optical coupler 622 may be referred to as a first optical multiplexing unit (not shown). In this case, the first optical multiplexing unit may have an optical input loss of 10×log {1/(m+n)} dB.

Each of the plurality of optical couplers 621 to 623 may include a plurality of output ports. For example, each of the plurality of optical couplers 621 to 623 may include a first output port and a second output port. The transmitter 600 may use the first output port of each of the plurality of optical couplers 621 to 623 as a channel for monitoring an optical signal. Further, the transmitter 600 may use the second output port of each of the plurality of optical couplers 621 to 623 as a channel for a multiplexed signal. The transmitter 600 may perform wavelength multiplexing and monitoring functions on an optical signal.

The first to $(m+n)^{th}$ light sources 610-1 to 610-($m$+n) may output optical signals having different wavelengths. For example, the first light source 610-1 may output an optical signal having a first wavelength λ1. Further, the $(m+n)^{th}$ light source 610-($m$+n) may output an optical signal having an $(m+n)^{th}$ wavelength λm+n. Further, the first to $(m+n)^{th}$ light sources 610-1 to 610-($m$+n) may output optical signals having different optical output intensities. For example, the first light source 610-1 may output an optical signal having a first optical output intensity $P_{\lambda 1}$. Further, the $(m+n)^{th}$ light source 610-($m$+n) may output an optical signal having an $(m+n)^{th}$ optical output intensity $P_{\lambda m+n}$.

The first to $m^{th}$ light sources 610-1 to 610-$m$ may output optical signals having first to $m^{th}$ optical output intensities $P_{\lambda 1}$ to $P_{\lambda m}$ to the first optical coupler 621. The first optical coupler 621 may multiplex the optical signals having the first to $m^{th}$ optical output intensities $P_{\lambda 1}$ to $P_{\lambda m}$.

In this case, the first optical coupler 621 may include m or less output ports (not shown). The first optical coupler 621 may output the multiplexed optical signal to the third optical coupler 623 through one port of the output ports for additional optical multiplexing. Further, the first optical coupler 621 may output the multiplexed optical signal to the first monitoring light receiving element 631 through another port of the output ports for optical signal monitoring.

Each of the first to $m^{th}$ optical signals included in the multiplexed optical signal which is output to the first monitoring light receiving element 631 may have an insertion loss value of 10×log(l/m) dB per wavelength. That is, each of the first to $m^{th}$ optical signals included in the multiplexed optical signal which is output to the first monitoring light receiving element 631 may have first to $m^{th}$ optical output intensities $P_{\lambda 1}$/m to $P_{\lambda m}$/m.

Each of the first to $m^{th}$ optical output intensities $P_{\lambda 1}$/m to $P_{\lambda m}$/m may be more than an intensity of an optical signal which is generally monitored. Therefore, the first monitoring light receiving element 631 may monitor an intensity of an optical signal more than the intensity of the optical signal which is generally monitored.

The transmitter 600 may optimize a modulation bias condition of each of the first to $m^{th}$ light sources 610-1 to 610-$m$ on the basis of the optical signals monitored using the first monitoring light receiving element 631. The optical signals monitored using the first monitoring light receiving element 631 may be used as signals for an optical coupling alignment of the first to $m^{th}$ light sources 610-1 to 610-$m$ in a manufacturing process of the transmitter 600.

In the same manner, the $(m+1)^{th}$ to $(m+n)^{th}$ light sources 610-($m$+1) to 610-($m$+n) may output optical signals having $(m+1)^{th}$ to $(m+n)^{th}$ optical output intensities $P_{\lambda m+1}$ to $P_{\lambda m+n}$ to the second optical coupler 622. The second optical coupler 622 may multiplex the optical signals having the $(m+1)^{th}$ $(m+n)^{th}$ optical output intensities $P_{\lambda m+1}$ to $P_{\lambda m+n}$.

In this case, the second optical coupler 622 may include n or less output ports (not shown). The second optical coupler 622 may output the multiplexed optical signal to the third optical coupler 623 through one port of the output ports for additional optical multiplexing. Further, the second optical coupler 622 may output the multiplexed optical signal to the second monitoring light receiving element 632 through another port of the output ports for optical signal monitoring.

Each of the $(m+1)^{th}$ to $(m+n)^{th}$ optical signals included in the multiplexed optical signal which is output to the second monitoring light receiving element 632 may have an input loss value of 10×log(l/n) dB per wavelength. That is, each of the $(m+1)^{th}$ to $(m+n)^{th}$ optical signals included in the multiplexed optical signal which is output to the second monitoring light receiving element 632 may have $(m+1)^{th}$ to $(m+n)^{th}$ optical output intensities $P_{\lambda m+1}$/n to $P_{\lambda m+n}$/n.

Each of the $(m+1)^{th}$ to $(m+n)^{th}$ optical output intensities $P_{\lambda m+1}$/n to $P_{\lambda m+n}$/n may be more than an intensity of an optical signal which is generally monitored. Therefore, the second monitoring light receiving element 632 may monitor an intensity of an optical signal more than the intensity of the optical signal which is generally monitored.

The transmitter 600 may optimize a modulation bias condition of each of the $(m+1)^{th}$ to $(m+n)^{th}$ light sources 610-($m$+1) to 610-($m$+n) on the basis of the optical signals monitored using the second monitoring light receiving element 632. The optical signals monitored using the second monitoring light receiving element 632 may be used as signals for an optical coupling alignment of the $(m+1)^{th}$ to $(m+n)^{th}$ light sources 610-($m$+1) to 610-($m$+n) in the manufacturing process of the transmitter 600.

The third optical coupler 623 may include a plurality of input and output ports (not shown). For example, the third optical coupler 623 may receive an optical signal, which is output from the first optical coupler 621, through a first input port (not shown). The third optical coupler 623 may receive an optical signal, which is output from the second optical coupler 622, through a second input port (not shown).

The third optical coupler 623 may multiplex the optical signals which are output from the first optical coupler 621 and the second optical coupler 622. That is, the third optical coupler 623 may output the multiplexed optical signal having n wavelengths. The third optical coupler 623 may output a multiplexed optical signal 640 to the optical output interface 650 through a first output port (not shown).

The third optical coupler 623 may output the multiplexed optical signal to the third monitoring light receiving element 633 through a second output port (not shown). The third monitoring light receiving element 633 may monitor the multiplexed optical signal which is output from the third optical coupler 623. That is, the third monitoring light receiving element 633 may monitor an optical signal for (m+n) wavelengths. In other words, the third monitoring light receiving element 633 may monitor an optical signal having first to $(m+n)^{th}$ wavelengths λ1 to λm+n.

In this case, optical output intensities of the optical signal for each wavelength may be first to $(m+n)^{th}$ optical output intensities $P_{\lambda 1}$/n to $P_{\lambda m+n}$/n. That is, the third monitoring light receiving element 633 may monitor an optical signal having an input loss value of 10×log(l/n) dB per wavelength. The first to third monitoring light receiving elements 631 to 633 may be mounted on one chip or may be mounted on a chip into which different types of chips are integrated. The input loss value per wavelength may be less than 10×log(l/m) dB, or less than 10×log(l/n) dB.

Figure 7:
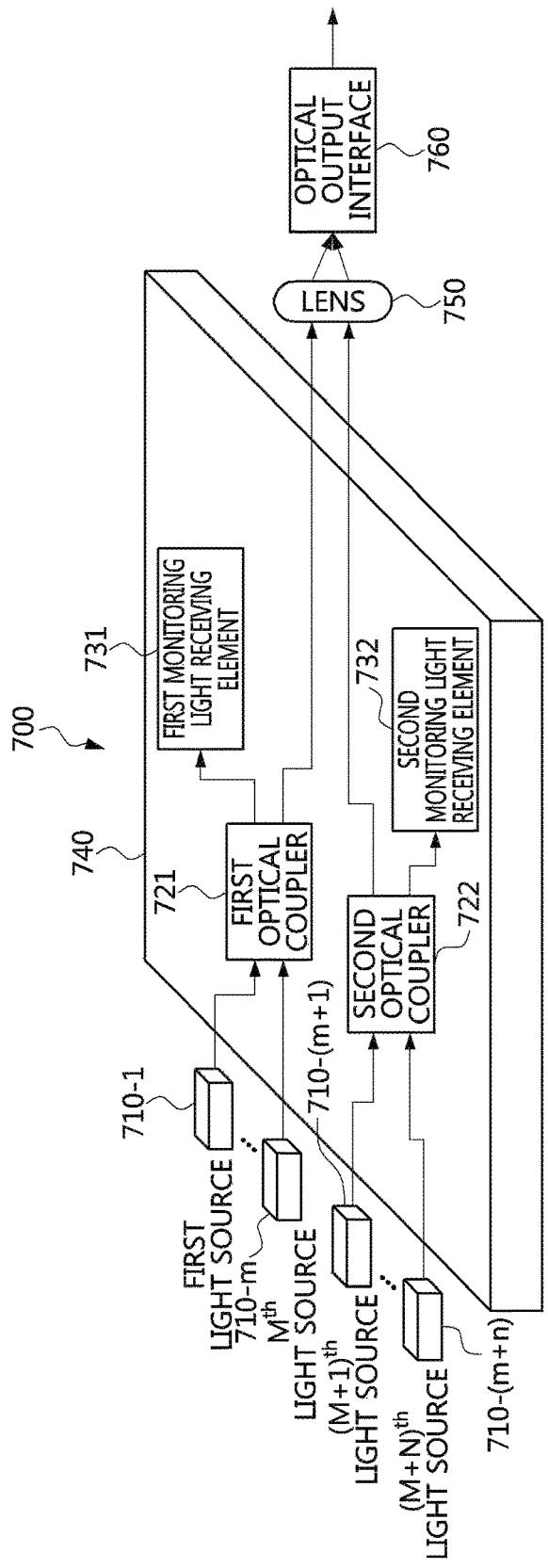
FIG. 7 is a block diagram showing a structure of a transmitter according to a fourth example embodiment.

FIG. 7 is a block diagram showing a structure of a transmitter according to a fourth example embodiment.

Referring to FIG. 7, a transmitter 700 may include a plurality of light sources 710-1 to 710-($m$+n), a plurality of optical couplers 721 and 722, a plurality of monitoring light receiving elements 731 and 732, a lens 750, and an optical output interface 760.

Each of the plurality of light sources 710-1 to 710-($m$+n) may convert an electrical signal into an optical signal. Each of the plurality of light sources 710-1 to 710-($m$+n) may convert a received electrical signal into an optical signal and output the optical signal. For example, each of the plurality of light sources 710-1 to 710-($m$+n) may include a PD (not shown).

The plurality of light sources 710-1 to 710-($m$+n) may be connected to the optical couplers. For example, the first to $m^{th}$ light sources 710-1 to 710-$m$ may be connected to a first optical coupler 721. Further, the $(m+1)^{th}$ $(m+n)^{th}$ light sources 710-($m$+1) to 710-($m$+n) may be connected to a second optical coupler 722.

Each of the plurality of optical couplers 721 and 722 may receive a plurality of optical signals and combine the plurality of optical signals into one optical signal. Each of the plurality of optical couplers 721 and 722 may include an optical splitter (not shown) or an MMI (not shown).

Each of the plurality of optical couplers 721 and 722 may be connected to a plurality of light sources, a monitoring light receiving element, and another optical coupler. For example, the first optical coupler 721 may be connected to the first to $m^{th}$ light sources 710-1 to 710-$m$, and a first monitoring light receiving element 731. Further, the second optical coupler 722 may be connected to the $(m+1)^{th}$ to $(m+n)^{th}$ light sources 710-($m$+1) to 710-($m$+n), and a second monitoring light receiving element 732.

Each of the plurality of monitoring light receiving elements 731 and 732 may monitor an optical signal. For example, each of the plurality of monitoring light receiving elements 731 and 732 may detect an optical signal which is output from the optical coupler. Each of the plurality of monitoring light receiving elements 731 and 732 may include a monitor PD (not shown).

The plurality of optical couplers 721 and 722 and the plurality of monitoring light receiving elements 731 and 732 may be mounted on a PLC substrate 740.

The first optical coupler 721 may include a plurality of input ports (not shown) and a plurality of output ports (not shown). For example, the first optical coupler 721 may include first to $m^{th}$ input ports (not shown). The first input port of the first optical coupler 721 may be connected to the first light source 710-1. The $m^{th}$ input port of the first optical coupler 721 may be connected to the $m^{th}$ light source 710-$m$.

The first optical coupler 721 may include a first output port (not shown) and a second output port (not shown). The first output port of the first optical coupler 721 may be connected to the first monitoring light receiving element 731. The second output port of the first optical coupler 721 may be connected to the lens 750.

The first optical coupler 721 may receive optical signals from the plurality of light sources through the plurality of input ports. The first optical coupler 721 may receive first to $m^{th}$ optical signals, which are output from the first to $m^{th}$ light sources 710-1 to 710-$m$, through the first to $m^{th}$ input ports.

For example, the first optical coupler 721 may receive an optical signal from the first light source 710-1 through the first input port. Further, the first optical coupler 721 may receive an optical signal from the $m^{th}$ light source 710-$m$ through the $m^{th}$ input port. The first optical coupler 721 may multiplex the first to $m^{th}$ optical signals into one optical signal. That is, the first optical coupler 721 may output the multiplexed optical signal.

The first optical coupler 721 may transmit the multiplexed optical signal to the first monitoring light receiving element 731 through the first output port. The first monitoring light receiving element 731 may detect the optical signal which is output through the first output port of the first optical coupler 721. Further, the first optical coupler 721 may transmit the multiplexed optical signal to the lens 750 through the second output port.

The second optical coupler 722 may include a plurality of input ports (not shown) and a plurality of output ports (not shown). For example, the second optical coupler 722 may include $(m+1)^{th}$ to $(m+n)^{th}$ input ports (not shown). The $(m+1)^{th}$ input port of the second optical coupler 722 may be connected to the $(m+1)^{th}$ light source 710-($m$+1). The $(m+n)^{th}$ input port of the second optical coupler 722 may be connected to the $(m+n)^{th}$ light source 710-($m$+n).

The second optical coupler 722 may include a first output port (not shown) and a second output port (not shown). The first output port of the second optical coupler 722 may be connected to the second monitoring light receiving element 732. The second output port of the second optical coupler 722 may be connected to the lens 750.

The second optical coupler 722 may receive optical signals from the plurality of light sources through the plurality of input ports. The second optical coupler 722 may receive $(m+1)^{th}$ to $(m+n)^{th}$ optical signals, which are output from the $(m+1)^{th}$ to $(m+n)^{th}$ light sources 710-($m$+1) to 710-($m$+n), through the $(m+1)^{th}$ to $(m+n)^{th}$ input ports.

For example, the second optical coupler 722 may receive an optical signal from the $(m+1)^{th}$ light source 710-($m$+1) through the first input port. Further, the second optical coupler 722 may receive an optical signal from the $(m+n)^{th}$ light source 710-($m$+n) through the $(m+n)^{th}$ input port. The second optical coupler 722 may multiplex the $(m+1)^{th}$ to $(m+n)^{th}$ optical signals into one optical signal. That is, the second optical coupler 722 may output the multiplexed optical signal.

The second optical coupler 722 may transmit the multiplexed optical signal to the second monitoring light receiving element 732 through the first output port. The second monitoring light receiving element 732 may detect the optical signal which is output through the first output port of the second optical coupler 722. Further, the second optical coupler 722 may transmit the multiplexed optical signal to the lens 750 through the second output port.

The lens 750 may be an optical coupling lens. The optical coupling lens 750 may include one surface and the other surface. For example, the optical coupling lens 750 may receive an optical signal, which is output from the second output port of the first optical coupler 721, through the one surface. Further, the optical coupling lens 750 may receive an optical signal, which is output from the second output port of the second optical coupler 722, through the one surface. The optical coupling lens 750 may multiplex the optical signal received from the first optical coupler 721 and the optical signal received from the second optical coupler 722 into one optical signal.

The optical coupling lens 750 may output the multiplexed optical signal to the optical output interface 760 through the other surface. The optical output interface 760 may include an input port (not shown) and an output port (not shown). The optical output interface 760 may output an optical signal, which is received through the input port, through the output port.

The first optical coupler 721 and the second optical coupler 722 may be referred to as a first optical coupling unit. The first monitoring light receiving element 731 and the second monitoring light receiving element 732 may be referred to as a monitoring unit or a first monitoring unit. The optical coupling lens 750 may be referred to as a second optical coupling unit.

In FIG. 7, two optical couplers 721 and 722, two monitoring light receiving elements 731 and 732, one lens 750, and one optical output interface 760 are shown for convenience of description. However, one optical coupler or more than two optical couplers may be provided. Further, one monitoring light receiving element or more than two monitoring light receiving elements may be provided. Further, a plurality of lenses may be provided. Further, a plurality of optical output interfaces may be provided.

Figure 8:
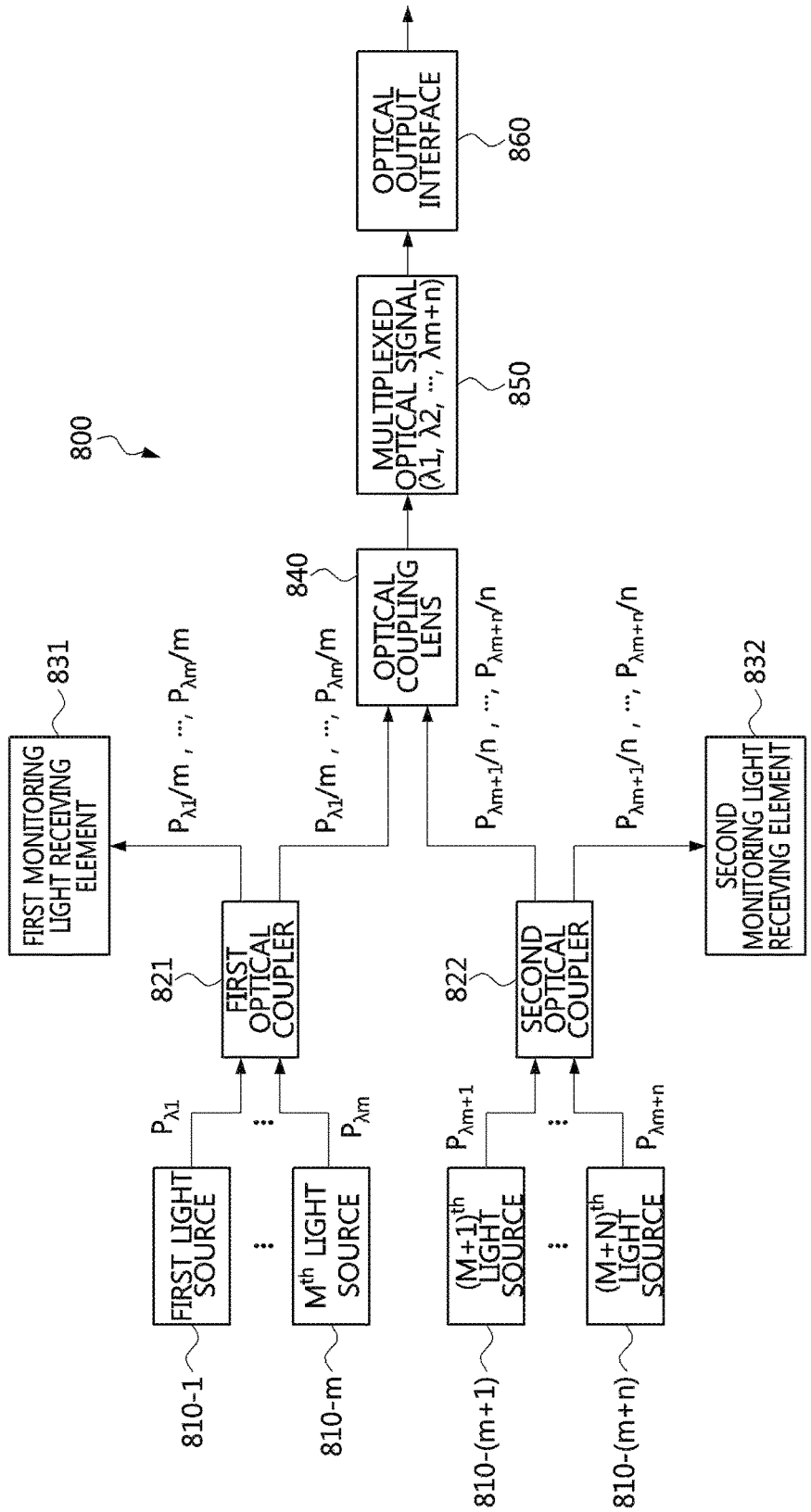
FIG. 8 is a conceptual diagram showing a signal flow of a transmitter according to the fourth example embodiment.

FIG. 8 is a conceptual diagram showing a signal flow of a transmitter according to the fourth example embodiment.

Referring to FIG. 8, a transmitter 800 may include a plurality of light sources 810-1 to 810-($m$+n), a plurality of optical couplers 821 and 822, a plurality of monitoring light receiving elements 831 and 832, and an optical output interface 860. The transmitter 800 may operate in an identical or similar manner to the operation of the transmitter 700 of FIG. 7. That is, components of the transmitter 800 may operate in an identical or similar manner to the operations of the components of the transmitter 700 of FIG. 7.

Each of the plurality of optical couplers 821 and 822 may have a structure of n×n input and output ports. In this case, each of the plurality of optical couplers 821 and 822 may have an optical input loss of 10×log(l/n) dB per input port. For example, the first optical coupler 821 may include m input ports. The second optical coupler 822 may include n input ports. Here, m and n may be the same integer or different integers. The first optical coupler 821 and the second optical coupler 822 may be referred to as a first optical multiplexing unit (not shown). In this case, the first optical multiplexing unit may have an optical input loss of 10×log {1/(m+n)} dB.

Each of the plurality of optical couplers 821 and 822 may include a plurality of output ports. For example, each of the plurality of optical couplers 821 and 822 may include a first output port and a second output port. The transmitter 800 may use the first output port of each of the plurality of optical couplers 821 and 822 as a channel for monitoring an optical signal. Further, the transmitter 800 may use the second output port of each of the plurality of optical couplers 821 and 822 as a channel for a multiplexed signal. The transmitter 800 may perform wavelength multiplexing and monitoring functions on an optical signal.

The first to (m+n)$^{th}$ light sources 810-1 to 810-($m$+n) may output optical signals having different wavelengths. For example, the first light source 810-1 may output an optical signal having a first wavelength λ1. Further, the (m+n)$^{th}$ light source 810-($m$+n) may output an optical signal having an (m+n)$^{th}$ wavelength λm+n. Further, each of the first to (m+n)$^{th}$ light sources 810-1 to 810-($m$+n) may output an optical signal having an optical output intensity. For example, the first light source 810-1 may output an optical signal having a first optical output intensity $P_{\lambda 1}$. Further, the (m+n)$^{th}$ light source 810-($m$+n) may output an optical signal having an (m+n)$^{th}$ optical output intensity $P_{\lambda m+n}$.

The first to m$^{th}$ light sources 810-1 to 810-$m$ may output optical signals having first to m$^{th}$ optical output intensities $P_{\lambda 1}$ to $P_{\lambda m}$ to the first optical coupler 821. The first optical coupler 821 may multiplex the optical signals having the first to m$^{th}$ optical output intensities $P_{\lambda 1}$ to $P_{\lambda m}$ into one optical signal.

In this case, the first optical coupler 821 may include m or less output ports (not shown). The first optical coupler 821 may output the multiplexed optical signal to an optical coupling lens 840 through one port of the output ports for additional optical multiplexing. Further, the first optical coupler 821 may output the multiplexed optical signal to the first monitoring light receiving element 831 through another port of the output ports for optical signal monitoring.

Each of the first to m$^{th}$ optical signals included in the multiplexed optical signal which is output to the first monitoring light receiving element 831 may have an insertion loss value of 10×log(l/m) dB per wavelength. That is, each of the first to m$^{th}$ optical signals included in the multiplexed optical signal which is output to the first monitoring light receiving element 831 may have first to m$^{th}$ optical output intensities $P_{\lambda 1}$/m to $P_{\lambda m}$/m.

Each of the first to m$^{th}$ optical output intensities $P_{\lambda 1}$/m to $P_{\lambda m}$/m may be more than an intensity of an optical signal which is generally monitored. Therefore, the first monitoring light receiving element 831 may monitor an intensity of an optical signal more than the intensity of the optical signal which is generally monitored.

The transmitter 800 may optimize a modulation bias condition of each of the first to m$^{th}$ light sources 810-1 to 810-$m$ on the basis of the optical signals monitored using the first monitoring light receiving element 831. The optical signals monitored using the first monitoring light receiving element 831 may be used as signals for optical coupling an alignment of the first to m$^{th}$ light sources 810-1 to 810-$m$ in a manufacturing process of the transmitter 800.

In the same manner, the (m+1)$^{th}$ to (m+n)$^{th}$ light sources 810-($m$+1) to 810-($m$+n) may output optical signals having (m+1)$^{th}$ to (m+n)$^{th}$ optical output intensities $P_{\lambda m+1}$ to $P_{\lambda m+n}$ to the second optical coupler 822. The second optical coupler 822 may multiplex the optical signals having the (m+1)$^{th}$ to (m+n)$^{th}$ optical output intensities $P_{\lambda m+1}$ to $P_{\lambda m+n}$.

In this case, the second optical coupler 822 may include n or less output ports (not shown). The second optical coupler 822 may output the multiplexed optical signal to the optical coupling lens 840 through one port of the output ports for additional optical multiplexing. Further, the second optical coupler 822 may output the multiplexed optical signal to the second monitoring light receiving element 832 through another port of the output ports for optical signal monitoring.

Each of the (m+1)$^{th}$ to (m+n)$^{th}$ optical signals included in the multiplexed optical signal which is output to the second monitoring light receiving element 832 may have an input loss value of 10×log(l/n) dB per wavelength. That is, each of the (m+1)$^{th}$ to (m+n)$^{th}$ optical signals included in the multiplexed optical signals which are output to the second monitoring light receiving element 832 may have (m+1)$^{th}$ to (m+n)$^{th}$ optical output intensities $P_{\lambda m+1}$/n to $P_{\lambda m+n}$/n.

Each of the (m+1)$^{th}$ to (m+n)$^{th}$ optical output intensities $P_{\lambda m+1}$/n to $P_{\lambda m \pm n}$/n may be more than an intensity of an optical signal which is generally monitored. Therefore, the second monitoring light receiving element 832 may monitor an intensity of an optical signal more than the intensity of the optical signal which is generally monitored.

The transmitter 800 may optimize a modulation bias condition of each of the (m+1)$^{th}$ to (m+n)$^{th}$ light sources 810-($m$+1) to 810-($m$+n) on the basis of the optical signals monitored using the second monitoring light receiving element 832. The optical signals monitored using the second monitoring light receiving element 832 may be used as signals for an optical coupling alignment of the (m+1)$^{th}$ to (m+n)$^{th}$ light sources 810-($m$+1) to 810-($m$+n) in the manufacturing process of the transmitter 800.

The optical coupling lens 840 may include one surface and the other surface. For example, the optical coupling lens 840 may receive an optical signal, which is output from the first optical coupler 821, through the one surface. Further, the optical coupling lens 840 may receive the optical signal, which is output from the second optical coupler 822, through the one surface.

The optical coupling lens 840 may multiplex the optical signal which is output from the first optical coupler 821 and the optical signal which is output from the second optical coupler 822. That is, the optical coupling lens 840 may output the multiplexed optical signal having (m+n) wavelengths. The optical coupling lens 840 may output a multiplexed optical signal 850 to the optical output interface 860 through the other surface.

The first monitoring light receiving element 831 and the second monitoring light receiving element 832 may be mounted on one chip or may be mounted on a chip into which different types of chips are integrated. The input loss value per wavelength may be less than $10 \times \log(1/m)$ dB, or less than $10 \times \log(1/n)$ dB.

Figure 9:
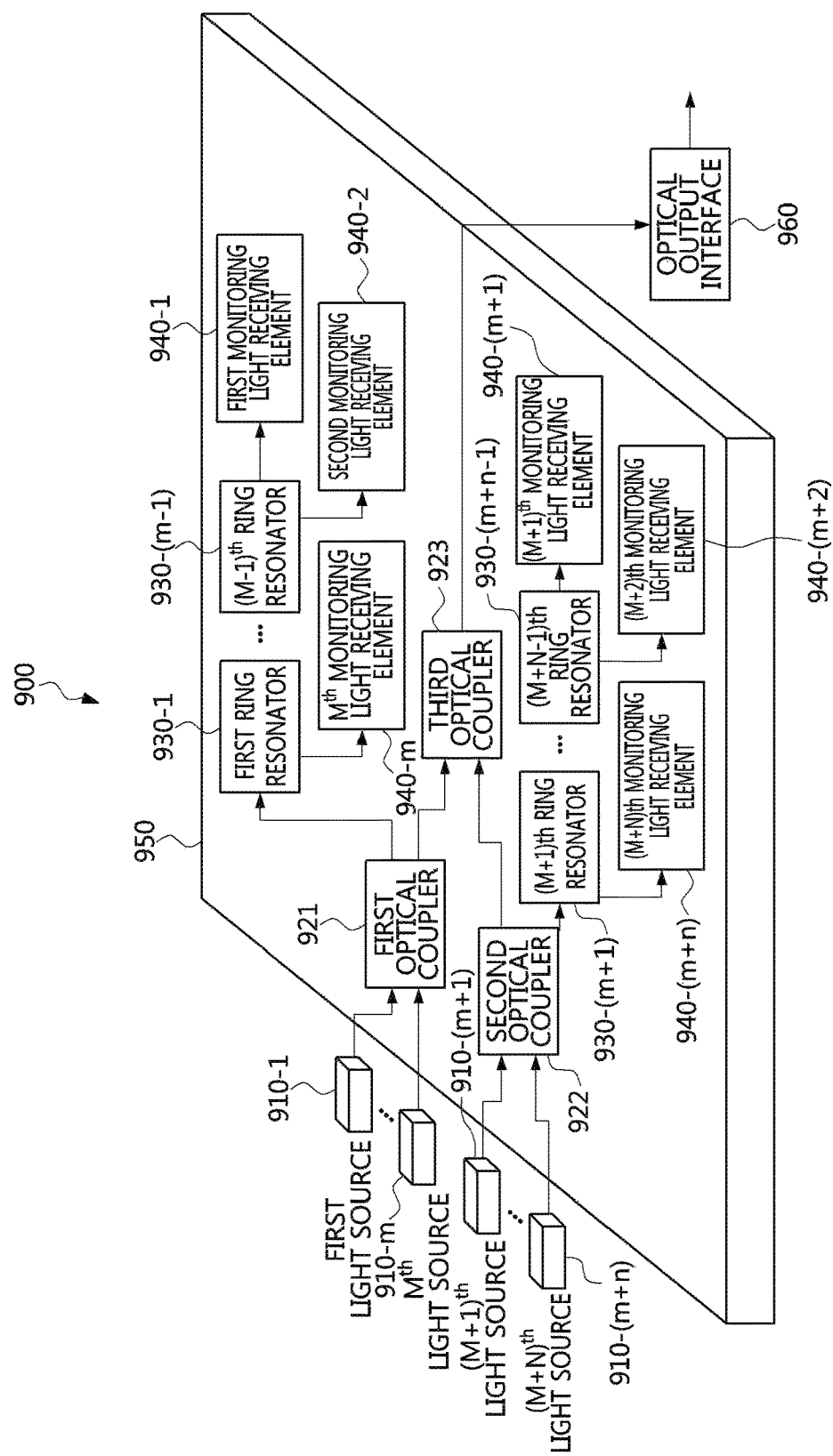
FIG. 9 is a block diagram showing a structure of a transmitter according to a fifth example embodiment.

FIG. 9 is a block diagram showing a structure of a transmitter according to a fifth example embodiment.

Referring to FIG. 9, a transmitter 900 may include a plurality of light sources 910-1 to 910-($m$+n), a plurality of optical couplers 921 to 923, a plurality of ring resonators 930-1 to 930-($m$−1) and 930-(m+1) to 930-($m$+n−1), a plurality of monitoring light receiving elements 940-1 to 940-($m$+n), a PLC substrate 950, and an optical output interface 960.

Each of the plurality of light sources 910-1 to 910-($m$+n) may convert an electrical signal into an optical signal. Each of the plurality of light sources 910-1 to 910-($m$+n) may output a received electrical signal into an optical signal and output the optical signal. For example, each of the plurality of light sources 910-1 to 910-($m$+n) may include a PD (not shown).

The plurality of light sources 910-1 to 910-($m$+n) may be connected to the optical couplers. For example, the first to $m^{th}$ light sources 910-1 to 910-$m$ may be connected to a first optical coupler 921. Further, the $(m+1)^{th}$ to $(m+n)^{th}$ light sources 910-($m$+1) to 910-($m$+n) may be connected to a second optical coupler 922.

Each of the plurality of optical couplers 921 to 923 may receive a plurality of optical signals and combine the plurality of optical signals into one optical signal. Each of the plurality of optical couplers 921 to 923 may include an optical splitter (not shown) or an MMI (not shown).

Each of the plurality of optical couplers 921 to 923 may be connected to a plurality of light sources, a monitoring light receiving element, and another optical coupler. For example, the first optical coupler 921 may be connected to first to $m^{th}$ light sources 910-1 to 910-$m$, a first monitoring light receiving element 940-1, and a third optical coupler 923. Further, the second optical coupler 922 may be connected to $(m+1)^{th}$ to $(m+n)^{th}$ light sources 910-($m$+1) to 910-($m$+n), a second monitoring light receiving element 940-2, and the third optical coupler 923.

Each of the plurality of ring resonators 930-1 to 930-($m$−1) and 930-(m+1) to 930-($m$+n−1) may separate the multiplexed optical signal for each wavelength. For example, each of the plurality of ring resonators 930-1 to 930-($m$−1) and 930-(m+1) to 930-($m$+n−1) may include a resonator formed by a ring-shaped circulation structure. The ring resonator may include a coupler for input and output. The ring resonator may perform a function of filtering a specific wavelength. The ring resonator may be connected to another ring resonator and at least one of the monitoring light receiving elements.

Each of the plurality of monitoring light receiving elements 940-1 to 940-($m$+n) may monitor an optical signal. For example, each of the plurality of monitoring light receiving elements 940-1 to 940-($m$+n) may detect an optical signal which is output from the optical coupler. Each of the plurality of monitoring light receiving elements 940-1 to 940-($m$+n) may include a monitor PD (not shown).

The plurality of optical couplers 921 to 923, the plurality of ring resonators 930-1 to 930-($m$−1) and 930-(m+1) to 930-($m$+n−1), and the plurality of monitoring light receiving elements 940-1 to 940-($m$+n) may be mounted on the PLC substrate 950. For example, the plurality of optical couplers 921 to 923, the plurality of ring resonators 930-1 to 930-($m$−1) and 930-(m+1) to 930-($m$+n−1), and the plurality of monitoring light receiving elements 940-1 to 940-($m$+n) may be mounted on an upper surface or a lower surface of the PLC substrate 950.

The first optical coupler 921 may include a plurality of input ports (not shown) and a plurality of output ports (not shown). For example, the first optical coupler 921 may include first to $m^{th}$ input ports (not shown). The first input port of the first optical coupler 921 may be connected to a first light source 910-1. The $m^{th}$ input port of the first optical coupler 921 may be connected to an $m^{th}$ light source 910-$m$.

The first optical coupler 921 may include a first output port (not shown) and a second output port (not shown). The first output port of the first optical coupler 921 may be connected to a first ring resonator 930-1. The second output port of the first optical coupler 921 may be connected to the third optical coupler 923.

The first optical coupler 921 may receive optical signals from the plurality of light sources through the plurality of input ports. The first optical coupler 921 may receive first to $m^{th}$ optical signals, which are output from the first to $m^{th}$ light sources 910-1 to 910-$m$, through the first to $m^{th}$ input ports.

For example, the first optical coupler 921 may receive the optical signal from the first light source 910-1 through the first input port. Further, the first optical coupler 921 may receive the optical signal from the $m^{th}$ light source 910-$m$ through the $m^{th}$ input port. The first optical coupler 921 may multiplex the first to $m^{th}$ optical signals into one optical signal. That is, the first optical coupler 921 may output the multiplexed optical signal.

The first optical coupler 921 may transmit the multiplexed optical signal to the first ring resonator 930-1 through the first output port. The first optical coupler 921 may transmit the multiplexed optical signal to the third optical coupler 923 through the second output port.

The first ring resonator 930-1 may include a plurality of input and output ports. For example, the first ring resonator 930-1 may receive the multiplexed optical signal from the first optical coupler 921 through the input port. The first ring resonator 930-1 may separate the multiplexed optical signal for each wavelength. For example, the first ring resonator 930-1 may separate the $m^{th}$ optical signal from the multiplexed optical signal.

The first ring resonator 930-1 may transmit the multiplexed optical signal to an $(m-1)^{th}$ ring resonator 930-($m$−1) through the first output port. The first ring resonator 930-1 may transmit the $m^{th}$ optical signal to the $m^{th}$ monitoring light receiving element 940-$m$ through the second output port. The $m^{th}$ monitoring light receiving element 940-$m$ may detect the $m^{th}$ optical signal which is output through the second output port of the first ring resonator 930-1.

The $(m-1)^{th}$ ring resonator 930-($m$−1) may include a plurality of input and output ports. The $(m-1)^{th}$ ring resonator 930-($m$−1) may receive the multiplexed optical signal, which is output from the first ring resonator 930-1, through the input port. The $(m-1)^{th}$ ring resonator 930-($m$−1) may separate the multiplexed optical signal for each wavelength. For example, the $(m-1)^{th}$ ring resonator 930-($m$−1) may separate the multiplexed optical signal into a first optical signal and a second optical signal.

The $(m-1)^{th}$ ring resonator 930-($m$−1) may transmit the first optical signal to the first monitoring light receiving element 940-1 through the first output port. The first monitoring light receiving element 940-1 may detect the first optical signal which is output through the first output port of the (m−1)$^{th}$ ring resonator 930-(*m*−1).

The (m−1)$^{th}$ ring resonator 930-(*m*−1) may transmit the second optical signal to the second monitoring light receiving element 940-2 through the second output port. The second monitoring light receiving element 940-2 may detect the second optical signal which is output through the second output port of the (m−1)$^{th}$ ring resonator 930-(*m*−1).

The second optical coupler 922 may include a plurality of input ports (not shown) and a plurality of output ports (not shown). For example, the second optical coupler 922 may include (m+1)$^{th}$ to (m+n)$^{th}$ input ports (not shown). The (m+1)$^{th}$ input port of the second optical coupler 922 may be connected to the (m+1)$^{th}$ light source 910-(*m*+1). The (m+n)$^{th}$ input port of the second optical coupler 922 may be connected to the (m+n)$^{th}$ light source 910-(*m*+n).

The second optical coupler 922 may include a first output port (not shown) and a second output port (not shown). The first output port of the second optical coupler 922 may be connected to the (m+1)$^{th}$ ring resonator 930-(*m*+1). The second output port of the second optical coupler 922 may be connected to the third optical coupler 923.

The second optical coupler 922 may receive optical signals from the plurality of light sources through the plurality of input ports. The second optical coupler 922 may receive (m+1)$^{th}$ to (m+n)$^{th}$ optical signals, which are output from the (m+1)$^{th}$ to (m+n)$^{th}$ light sources 910-(*m*+1) to 910-(*m*+n), through the (m+1)$^{th}$ to (m+n)$^{th}$ input ports.

For example, the second optical coupler 922 may receive an optical signal from the (m+1)$^{th}$ light source 910-(*m*+1) through the (m+1)$^{th}$ input port. Further, the second optical coupler 922 may receive an optical signal from the (m+n)$^{th}$ light source 910-(*m*+n) through the (m+n)$^{th}$ input port.

The second optical coupler 922 may transmit the multiplexed optical signal to the (m+1)$^{th}$ ring resonator 930-(*m*+1) through the first output port. The second optical coupler 922 may transmit the multiplexed optical signal to the third optical coupler 923 through the second output port.

The (m+1)$^{th}$ ring resonator 930-(*m*+1) may include a plurality of input and output ports. For example, the (m+1)$^{th}$ ring resonator 930-(*m*+1) may receive the multiplexed optical signal from the second optical coupler 922 through the input port. The (m+1)$^{th}$ ring resonator 930-(*m*+1) may separate the multiplexed optical signal for each wavelength. For example, the (m+1)$^{th}$ ring resonator 930-(*m*+1) may separate the n$^{th}$ optical signal from the multiplexed optical signal.

The (m+1)$^{th}$ ring resonator 930-(*m*+1) may transmit the multiplexed optical signal to the (m+n−1)$^{th}$ ring resonator 930-(*m*+n−1) through the first output port. The (m+1)$^{th}$ ring resonator 930-(*m*+1) may transmit the (m+n)$^{th}$ optical signal to the (m+n)$^{th}$ monitoring light receiving element 940-(*m*+n) through the second output port. The (m+n)$^{th}$ monitoring light receiving element 940-(*m*+n) may detect the (m+n)$^{th}$ optical signal which is output through the second output port of the (m+1)$^{th}$ ring resonator 930-(*m*+1).

The (m+n−1)$^{th}$ ring resonator 930-(*m*+n−1) may receive the multiplexed optical signal, which is output through the first output port of the (m+n−1)$^{th}$ ring resonator 930-(*m*+1), through the input port. The (m+n−1)$^{th}$ ring resonator 930-(*m*+n−1) may separate the multiplexed optical signal for each wavelength. For example, the (m+n−1)$^{th}$ ring resonator 930-(*m*+n−1) may separate the multiplexed optical signal into an (m+1)$^{th}$ optical signal and an (m+2)$^{th}$ optical signal.

The (m+n−1)$^{th}$ ring resonator 930-(*m*+n−1) may transmit the (m+1)$^{th}$ optical signal to the (m+1)$^{th}$ monitoring light receiving element 940-(*m*+1) through the first output port.

The (m+1)$^{th}$ monitoring light receiving element 940-(*m*+1) may detect the (m+1)$^{th}$ optical signal which is output through the first output port of the (m+n−1)$^{th}$ ring resonator 930-(*m*+n−1).

The (m+n−1)$^{th}$ ring resonator 930-(*m*+n−1) may transmit the (m+2)$^{th}$ optical signal to the (m+2)$^{th}$ monitoring light receiving element 940-(*m*+2) through the second output port. The (m+2)$^{th}$ monitoring light receiving element 940-(*m*+2) may detect the (m+2)$^{th}$ optical signal which is output through the second output port of the (m+n−1)$^{th}$ ring resonator 930-(*m*+n−1).

The third optical coupler 923 may include a plurality of input ports (not shown) and a plurality of output ports (not shown). For example, the third optical coupler 923 may include a first input port (not shown) and a second input port (not shown). The first input port of the third optical coupler 923 may be connected to the second output port of the first optical coupler 921. The second input port of the third optical coupler 923 may be connected to the second output port of the second optical coupler 922.

The third optical coupler 923 may receive optical signals from the plurality of optical couplers through the plurality of input ports. For example, the third optical coupler 923 may receive an optical signal, which is output from the second output port of the first optical coupler 921, through the first input port. Further, the third optical coupler 923 may receive an optical signal, which is output from the second output port of the second optical coupler 922 through the second input port. The third optical coupler 923 may multiplex the optical signal received from the first optical coupler 921 and the optical signal received from the second optical coupler 922 into one optical signal. The third optical coupler 923 may output the multiplexed optical signal to the optical output interface 960 through the output port.

The optical output interface 960 may include an input port (not shown) and an output port (not shown). The optical output interface 960 may output an optical signal, which is received through the input port, through the output port.

The first optical coupler 921 and the second optical coupler 922 may be referred to as a first optical coupling unit. The plurality of ring resonators 930-1 to 930-(*m*−1) and 930-(m+1) to 930-(*m*+n−1) and the plurality of monitoring light receiving elements 940-1 to 940-(*m*+n) may be referred to as a monitoring unit or a first monitoring unit.

In FIG. 9, three optical couplers 921 to 923 and one optical output interface 960 are shown for convenience of description. However, two or less optical couplers or more than three optical couplers may be provided. Further, a plurality of optical output interfaces may be provided.

Figure 10:
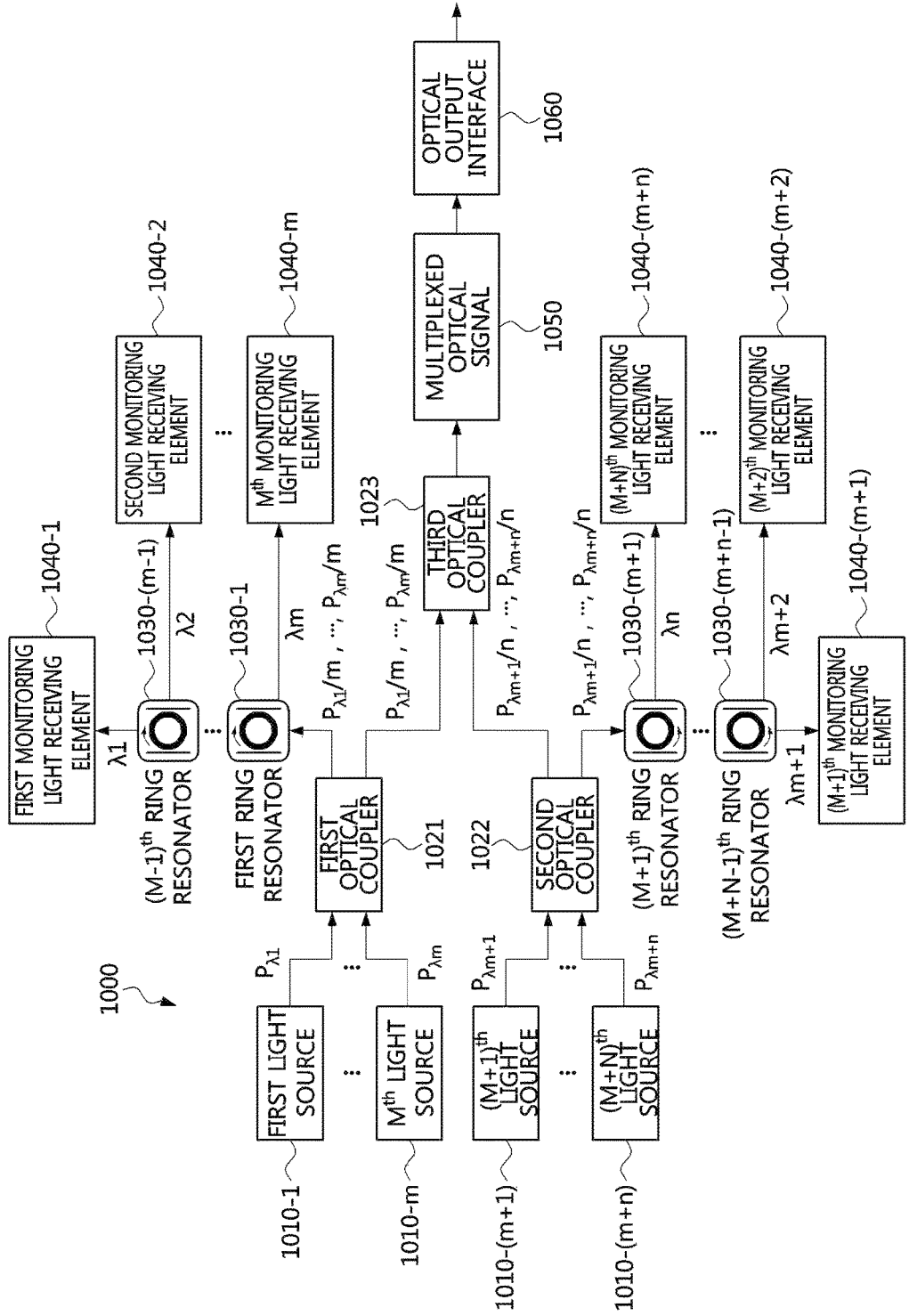
FIG. 10 is a conceptual diagram showing a signal flow of a transmitter according to the fifth example embodiment.

FIG. 10 is a conceptual diagram showing a signal flow of a transmitter according to the fifth example embodiment.

Referring to FIG. 10, a transmitter 1000 may include a plurality of light sources 1010-1 to 1010-(*m*+n), a plurality of optical couplers 1021 to 1023, a plurality of ring resonators 1030-1 to 1030-(*m*−1) and 1030-(*m*+1) to 1030-(*m*+n−1), a plurality of monitoring light receiving elements 1040-1 to 1040-(*m*+n), and an optical output interface 1060. The transmitter 1000 may operate in an identical or similar manner to the operation of the transmitter 900 of FIG. 9. That is, components of the transmitter 1000 may operate in an identical or similar manner to the operations of the components of the transmitter 900 of FIG. 9.

Each of the plurality of optical couplers 1021 to 1023 may have a structure of m×m or n×n input and output ports. In this case, each of the plurality of optical couplers 1021 to 1023 may have an optical input loss of 10×log(1/m) dB or 10×log(1/n) dB per input port.

For example, a first optical coupler 1021 may include m input ports. A second optical coupler 1022 may include n input ports. Here, m and n may be the same integer or different integers. The first optical coupler 1021 and the second optical coupler 1022 may be referred to as a first optical multiplexing unit (not shown). In this case, the first optical multiplexing unit may have an optical input loss of $10 \times \log\{1/(m+n)\}$ dB.

Each of the plurality of optical couplers 1021 to 1023 may include a plurality of output ports. For example, each of the plurality of optical couplers 1021 to 1023 may include a first output port and a second output port. The transmitter 1000 may use the first output port of each of the plurality of optical couplers 1021 to 1023 as a channel for monitoring an optical signal. Further, the transmitter 1000 may use the second output port of each of the plurality of optical couplers 1021 to 1023 as a channel for a multiplexed signal. The transmitter 1000 may perform may perform wavelength multiplexing and monitoring functions on an optical signal.

The first to $(m+n)^{th}$ light sources 1010-1 to 1010-(m+n) may output optical signals having different wavelengths. For example, the first light source 1010-1 may output an optical signal of a first wavelength $\lambda 1$. Further, the $(m+n)^{th}$ light source 1010-(m+n) may output an optical signal of an $(m+n)^{th}$ wavelength $\lambda m+n$. Further, each of the first to $(m+n)^{th}$ light sources 1010-1 to 1010-(m+n) may output an optical signal having an optical output intensity. For example, the first light source 1010-1 may output an optical signal having a first optical output intensity $P_{\lambda 1}$. Further, the $(m+n)^{th}$ th light source 1010-(m+n) may output an optical signal having an $(m+n)^{th}$ optical output intensity $P_{m+n}$.

The first to $m^{th}$ light sources 1010-1 to 1010-m may output optical signals having first to $m^{th}$ optical output intensities $P_{\lambda 1}$ to $P_{\lambda m}$ to the first optical coupler 1021. The first optical coupler 1021 may multiplex the optical signals having the first to $m^{th}$ optical output intensities $P_{\lambda 1}$ to $P_{\lambda m}$.

In this case, the first optical coupler 1021 may include m or less output ports (not shown). The first optical coupler 1021 may output the multiplexed optical signal to the third optical coupler 1023 through one port of the output ports for additional optical multiplexing. Further, the first optical coupler 1021 may output the multiplexed optical signal to a first ring resonator 1030-1 through another port of the output ports for optical signal monitoring.

The first ring resonator 1030-1 may include a plurality of input and output ports. For example, the first ring resonator 1030-1 may receive the multiplexed optical signal from the first optical coupler 1021 through the input port. The first ring resonator 1030-1 may separate the multiplexed optical signal for each wavelength. For example, the first ring resonator 1030-1 may separate an $m^{th}$ optical signal having the first wavelength $\lambda m$ from the multiplexed optical signal.

The first ring resonator 1030-1 may transmit the multiplexed optical signal to an $(m-1)^{th}$ ring resonator 1030-(m-1) through the first output port. The first ring resonator 1030-1 may transmit the $m^{th}$ optical signal to the $m^{th}$ monitoring light receiving element 1040-m through the second output port. The $m^{th}$ monitoring light receiving element 1040-m may detect the $m^{th}$ optical signal which is output through the second output port of the first ring resonator 1030-1.

The $(m-1)^{th}$ ring resonator 1030-(m-1) may include a plurality of input and output ports. The $(m-1)^{th}$ ring resonator 1030-(m-1) may receive the multiplexed optical signal, which is output from the first ring resonator 1030-1, through the input port. The $(m-1)^{th}$ ring resonator 1030-(m-1) may separate the multiplexed optical signal for each wavelength. For example, the $(m-1)^{th}$ ring resonator 1030-(m-1) may separate the multiplexed optical signal into a first optical signal having a first wavelength $\lambda 1$ and a second optical signal having a second wavelength $\lambda 2$.

The $(m-1)^{th}$ ring resonator 1030-(m-1) may transmit the first optical signal to the first monitoring light receiving element 1040-1 through the first output port. The first monitoring light receiving element 1040-1 may detect the first optical signal which is output through the first output port of the $(m-1)^{th}$ ring resonator 1030-(m-1).

The $(m-1)^{th}$ ring resonator 1030-(m-1) may transmit the second optical signal to the second monitoring light receiving element 1040-2 through the second output port. The second monitoring light receiving element 1040-2 may detect the second optical signal which is output through the second output port of the $(m-1)^{th}$ ring resonator 1030-(m-1).

The first optical signal which is output to the first monitoring light receiving element 1040-1 may have an insertion loss value of $10 \times \log(1/m)$ dB per wavelength. That is, the first optical signal which is output to the first monitoring light receiving element 1040-1 may have a first optical output intensity $P_{\lambda 1}/m$.

Further, the second optical signal which is output to the second monitoring light receiving element 1040-2 may have an insertion loss value of $10 \times \log(1/m)$ dB per wavelength. That is, the second optical signal which is output to the second monitoring light receiving element 1040-2 may have a second optical output intensity $P_{\lambda 2}/m$.

In the same manner, the $m^{th}$ optical signal which is output to the $m^{th}$ monitoring light receiving element 1040-m may have an insertion loss value of $10 \times \log(1/m)$ dB per wavelength. That is, the $m^{th}$ optical signal which is output to the $m^{th}$ monitoring light receiving element 1040-m may have an $m^{th}$ optical output intensity $P_{\lambda m}/m$. In this case, each of the first to $m^{th}$ optical output intensities $P_{1\lambda}/m$ to $P_{\lambda m}/m$ may be more than an intensity of an optical signal which is generally monitored. Therefore, each of the first to $m^{th}$ monitoring light receiving elements 1040-1 to 1040-m may monitor an intensity of an optical signal more than the intensity of the optical signal which is generally monitored.

The transmitter 1000 may optimize a modulation bias condition of each of the first to $m^{th}$ light sources 1010-1 to 1010-m on the basis of the optical signals monitored using the first to $m^{th}$ monitoring light receiving elements 1040-1 to 1040-m. The optical signals monitored using the first to $m^{th}$ monitoring light receiving elements 1040-1 to 1040-m may be used as signals for an optical coupling alignment of the first to $m^{th}$ light sources 1010-1 to 1010-m in a manufacturing process of the transmitter 1000.

The $(m+1)^{th}$ to $(m+n)^{th}$ light sources 1010-(m+1) to 1010-(m+n) may output optical signals having $(m+1)^{th}$ to $(m+n)^{th}$ optical output intensities $P_{\lambda m+1}$ to $P_{\lambda m+n}$ to the second optical coupler 1022. The second optical coupler 1022 may multiplex the optical signals having the $(m+1)^{th}$ to $(m+n)^{th}$ optical output intensities $P_{\lambda m+1}$ to $P_{\lambda m+n}$.

In this case, the second optical coupler 1022 may include n or less output ports (not shown). The second optical coupler 1022 may output the multiplexed optical signal to a third optical coupler 1023 through one port of the output ports for additional optical multiplexing. Further, the second optical coupler 1022 may output the multiplexed optical signal to an $(m+1)^{th}$ ring resonator 1030-(m+1) through another port of the output ports for optical signal monitoring.

The $(m+1)^{th}$ ring resonator 1030-(m+1) may include a plurality of input and output ports. For example, the $(m+1)^{th}$ ring resonator 1030-(m+1) may receive the multiplexed optical signal from the second optical coupler 1022 through the input port. The $(m+1)^{th}$ ring resonator 1030-($m+1$) may separate the multiplexed optical signal for each wavelength. For example, the $(m+1)^{th}$ ring resonator 1030-($m+1$) may separate an $(m+n)^{th}$ optical signal having an $(m+n)^{th}$ wavelength λm+n from the multiplexed optical signal.

The $(m+1)^{th}$ ring resonator 1030-($m+1$) may transmit the multiplexed optical signal to an $(m+n-1)^{th}$ ring resonator 1030-($m+n-1$) through a first output port. The $(m+1)^{th}$ ring resonator 1030-($m+1$) may transmit the $(m+1)^{th}$ optical signal to the $(m+n)^{th}$ monitoring light receiving element 1040-($m+n$) through a second output port. The $(m+n)^{th}$ monitoring light receiving element 1040-($m+n$) may detect the $(m+n)^{th}$ optical signal which is output through the second output port of the $(m+1)^{th}$ ring resonator 1030-($m+1$).

The $(m+n-1)^{th}$ ring resonator 1030-($m+n-1$) may include a plurality of input and output ports. The $(m+n-1)^{th}$ ring resonator 1030-($m+n-1$) may receive the multiplexed optical signal, which is output from the $(m+1)^{th}$ ring resonator 1030-($m+1$), through the input port. The $(m+n-1)^{th}$ ring resonator 1030-($m+n-1$) may separate the multiplexed optical signal for each wavelength. For example, the $(m+n-1)^{th}$ ring resonator 1030-($m+n-1$) may separate the multiplexed optical signal into an $(m+1)^{th}$ optical signal having the $(m+1)^{th}$ wavelength λm+1 and an $(m+2)^{th}$ optical signal having the $(m+2)^{th}$ wavelength λm+2.

The $(m+n-1)^{th}$ ring resonator 1030-($m+n-1$) may transmit the $(m+1)^{th}$ optical signal to an $(m+1)^{th}$ monitoring light receiving element 1040-($m+1$) through a first output port. The $(m+1)^{th}$ monitoring light receiving element 1040-($m+1$) may detect the $(m+1)^{th}$ optical signal which is output through the first output port of the $(m+n-1)^{th}$ ring resonator 1030-($m+n-1$).

The $(m+n-1)^{th}$ ring resonator 1030-($m+n-1$) may transmit the $(m+2)^{th}$ optical signal to an $(m+2)^{th}$ monitoring light receiving element 1040-($m+2$) through a second output port. The $(m+2)^{th}$ monitoring light receiving element 1040-($m+2$) may detect the $(m+2)^{th}$ optical signal which is output through the second output port of the $(m+n-1)^{th}$ ring resonator 1030-($m+n-1$).

The $(m+1)^{th}$ optical signal which is output to the $(m+1)^{th}$ monitoring light receiving element 1040-($m+1$) may have an insertion loss value of $10 \times \log(1/m)$ dB per wavelength. That is, the $(m+1)^{th}$ optical signal which is output to the $(m+1)^{th}$ monitoring light receiving element 1040-($m+1$) may have an $(m+1)^{th}$ optical output intensity $P_{\lambda m+1}/n$.

Further, the $(m+2)^{th}$ optical signal which is output to the $(m+2)^{th}$ monitoring light receiving element 1040-($m+2$) may have an insertion loss value of $10 \times \log(1/m)$ dB per wavelength. That is, the $(m+2)^{th}$ optical signal which is output to the $(m+2)^{th}$ monitoring light receiving element 1040-($m+2$) may have an $(m+2)^{th}$ optical output intensity $P_{\lambda m+2}/n$.

In the same manner, the $(m+n)^{th}$ optical signal which is output to the $(m+n)^{th}$ monitoring light receiving element 1040-($m+n$) may have an insertion loss value of $10 \times \log(1/m)$ dB per wavelength. That is, the $(m+n)^{th}$ optical signal which is output to the $(m+n)^{th}$ monitoring light receiving element 1140-($m+n$) may have the $(m+n)^{th}$ optical output intensity $P_{\lambda m+n}/n$.

In this case, each of the $(m+1)^{th}$ to $(m+n)^{th}$ optical output intensities $P_{\lambda m+1}/n$ to $P_{\lambda m+n}/n$ may be more than an intensity of an optical signal which is generally monitored. Therefore, each of the $(m+1)^{th}$ to $(m+n)^{th}$ monitoring light receiving elements 1040-($m+1$) to 1040-($m+n$) may monitor an intensity of an optical signal more than the intensity of the optical signal which is generally monitored.

The transmitter 1000 may optimize a modulation bias condition of each of the $(m+1)^{th}$ to $(m+n)^{th}$ light sources 1010-($m+1$) to 1010-($m+n$) on the basis of the optical signals monitored using the $(m+1)^{th}$ to $(m+n)^{th}$ monitoring light receiving elements 1040-($m+1$) to 1040-($m+n$). The optical signals monitored using the $(m+1)^{th}$ to $(m+n)^{th}$ monitoring light receiving elements 1040-($m+1$) to 1040-($m+n$) may be used as signals for an optical coupling alignment of the $(m+1)^{th}$ to $(m+n)^{th}$ light sources 1010-($m+1$) to 1010-($m+n$) in the manufacturing process of the transmitter 1000.

The third optical coupler 1023 may include a plurality of input and output ports (not shown). For example, the third optical coupler 1023 may receive an optical signal, which is output from the first optical coupler 1021, through a first input port (not shown). The third optical coupler 1023 may receive an optical signal, which is output from the second optical coupler 1022, through a second input port (not shown).

The third optical coupler 1023 may multiplex the optical signal which is output from the first optical coupler 1021 and the optical signal which is output from the second optical coupler 1022. That is, the third optical coupler 1023 may output the multiplexed optical signal having (m+n) wavelengths. The third optical coupler 1023 may output a multiplexed optical signal 1050 to the optical output interface 1060 through a first output port (not shown).

FIG. 11 is a flowchart showing a sequence of operations of a transmitter according to a sixth example embodiment.

Referring to FIG. 11, the transmitter may multiplex optical signals, which are output from a plurality of light sources, using a plurality of optical couplers (a first optical multiplexing operation) (S1101).

The transmitter may multiplex the optical signals which are output through first output ports of the plurality of optical couplers (a second optical multiplexing operation) and may output the multiplexed optical signal (S1102).

For example, the transmitter may multiplex the optical signals, which are output through the first output ports of the plurality of optical couplers, using at least one optical coupler. The transmitter may output the multiplexed optical signal through a first output port and a second output port of at least one optical coupler.

Further, the transmitter may multiplex the optical signals, which are output through the first output ports of the plurality of optical couplers, using at least one optical coupling lens.

The transmitter may monitor optical signals which are output through second output ports of the plurality of optical couplers (a first monitoring operation) (S1103). For example, the transmitter may monitor the optical signals, which are output through the second output ports of the plurality of optical couplers, using a plurality of monitoring light receiving elements.

The transmitter may filter the multiplexed optical signal, which is output through the first output port of each of the plurality of optical couplers, for each wavelength using each of a plurality of optical ring resonators. Further, the transmitter may monitor the optical signal, which is filtered using each of the plurality of optical ring resonators, using the plurality of monitoring light receiving elements.

The transmitter may monitor the optical signal, which is output through the second output port of each of the plurality of optical couplers (a second monitoring operation). The transmitter may monitor the optical signal, which is output through the second output port each of the plurality of optical couplers, using at least one monitoring light receiving element connected to the second output port of a second optical multiplexing unit.

The transmitter may include a light source unit, a first optical multiplexing unit, a second optical multiplexing unit, a monitoring unit, an output unit, and a controller. The light source unit may include a plurality of light sources. The first optical multiplexing unit may include a plurality of optical couplers. The second optical multiplexing unit may include at least one optical coupler. The monitoring unit may include at least one monitoring unit.

Each of the plurality of light sources may output an optical signal. The first optical multiplexing unit may multiplex optical signals, which are output from the plurality of light sources, using the plurality of optical couplers. The second optical multiplexing unit may multiplex optical signals which are output through first output ports of the plurality of optical couplers and may output the multiplexed optical signal. The monitoring unit may include a first monitoring unit for monitoring the optical signals which are output through the second output ports of the plurality of optical couplers. The controller may control optical outputs of the plurality of light sources on the basis of a result of the monitoring.

The first monitoring unit may include a plurality of monitoring light receiving elements. The plurality of monitoring light receiving elements may be connected to the first output ports of the plurality of optical couplers.

The second optical multiplexing unit may include at least one optical coupler for multiplexing the optical signals which are output using the first optical multiplexing unit. At least one optical coupler may output the multiplexed optical signal through a first output port and a second output port thereof.

The transmitter may further include a second monitoring unit for monitoring an optical signal which is output through a second output port of the second optical multiplexing unit. The second monitoring unit may include at least one monitoring light receiving element connected to the second output port of the second optical multiplexing unit.

The second optical multiplexing unit may include at least one optical coupling lens for multiplexing the optical signals which are output using the first optical multiplexing unit.

The first monitoring unit may include a plurality of optical ring resonators and a plurality of monitoring light receiving elements. Each of the plurality of optical ring resonators may filter the multiplexed optical signal, which is output through the first output port of each of the plurality of optical couplers, for each wavelength. Each of the plurality of monitoring light receiving elements may monitor the optical signal filtered using each of the plurality of optical ring resonators.

The transmitter may further include a PLC substrate on which the first optical multiplexing unit, the second optical multiplexing unit, and the first monitoring unit are mounted.

The methods according to the embodiments may be implemented in the form of program instructions that may be executed through various computer units and recorded in computer readable recording media. The computer readable recording media may include a program instruction, a data file, a data structure, or combinations thereof. The program instruction recorded in the computer readable recording media may be specially designed and prepared for the embodiments of the present invention or may be an available well-known instruction for those skilled in the field of computer software.

Examples of the computer readable recording media include a hardware device, such as a ROM, a RAM, or a flash memory, that is specially made to store and execute the program instruction. Examples of the program instruction may include a machine code generated by a compiler and a high-level language code that may be executed in a computer using an interpreter. Such a hardware device may be configured as at least one software module in order to perform operations of the present invention and vice versa.

According to the present invention, a transmitter in an optical communication system can optimize a modulation bias of a plurality of light sources by multiplexing and monitoring optical signals which are output from the plurality of light sources through a plurality of channels, and can easily align the plurality of light sources during a manufacturing process.

While the present invention has been described with reference to the exemplary embodiments, it will be understood by those skilled in the art that various changes and modifications may be made without departing from the spirit and scope of the present invention as defined by the appended claims.

What is claimed is:

1. A transmitter for transmitting an optical signal in an optical communication system, the transmitter comprising:
   a plurality of light sources configured to output optical signals;
   a plurality of first optical couplers configured to multiplex the optical signals, which are output from the plurality of light sources, to generate a first optical signal, and output the first optical signal through a first output port and a second output port of each of the plurality of first optical couplers;
   a first monitoring unit configured to monitor the first optical signal which is output through the second output port of each of the plurality of first optical couplers; and
   a controller configured to control an optical output of each of the plurality of light sources on the basis of a result of the monitoring,
   wherein the first monitoring unit includes a plurality of monitoring light receiving elements configured to monitor the first optical signal.

2. The transmitter of claim 1, wherein:
   each of the plurality of monitoring light receiving elements is connected to the second output port of each of the plurality of first optical couplers.

3. The transmitter of claim 1, further comprising a second optical coupler configured to multiplex the first optical signal, which is output through the first output port of each of the plurality of first optical couplers, to generate a second optical signal.

4. The transmitter of claim 3, wherein the second optical coupler outputs the second optical signal through a first output port and a second output port of the second optical coupler.

5. The transmitter of claim 4, further comprising at least one monitoring light receiving element configured to monitor the second optical signal which is output through the second output port of the second optical coupler,
   wherein the at least one monitoring light receiving element is connected to the second output port of the second optical coupler.

6. The transmitter of claim 3, wherein:
   the second optical coupler includes an optical coupling lens; and
   the second optical coupler multiplexes the first optical signal to generate a second optical signal by using the optical coupling lens.

7. The transmitter of claim 3, further comprising a planar lightwave circuit substrate on which the plurality of first optical couplers, the second optical coupler, and the first monitoring unit are mounted.

8. The transmitter of claim 1, wherein:
the first monitoring unit includes a plurality of optical ring resonators and a plurality of monitoring light receiving elements;
each of the plurality of optical ring resonators filters the first optical signal, which is output through the second output port of each of the plurality of first optical couplers, for each wavelength; and
each of the plurality of monitoring light receiving elements monitors the first optical signal filtered using each of the plurality of optical ring resonators.

9. A method of operating a transmitter for transmitting an optical signal in an optical communication system, the method comprising:
multiplexing optical signals which are output from a plurality of light sources using each of a plurality of first optical couplers to generate a first optical signal;
outputting the first optical signal through a first output port and a second output port of each of the plurality of first optical couplers;
monitoring the first optical signal which is output through the second output port of each of the plurality of first optical couplers; and
controlling an optical output of each of the plurality of light sources on the basis of a result of the monitoring,
wherein the first optical signal is monitored using a plurality of monitoring light receiving elements connected to the second output port of each of the plurality of first optical couplers.

10. The method of claim 9, further comprising multiplexing the first optical signal, which is output through the first output port of each of the plurality of first optical couplers, using a second optical coupler to generate a second optical signal.

11. The method of claim 10, further comprising outputting the second optical signal through a first output port and a second output port of the second optical coupler.

12. The method of claim 11, further comprising monitoring the second optical signal which is output through the second output port of the second optical coupler,
wherein the second optical signal is monitored using at least one monitoring light receiving element connected to the second output port of the second optical coupler.

13. The method of claim 9, further comprising generating a second optical signal by multiplexing the first optical signal, which is output through the first output port of each of the plurality of first optical couplers, using at least one optical coupling lens.

14. The method of claim 9, further comprising filtering the first optical signal, which is output through the first output port of each of the plurality of first optical couplers, using each of a plurality of optical ring resonators for each wavelength.

15. The method of claim 14, further comprising monitoring the first optical signal, which is filtered using each of the plurality of optical ring resonators, using each of a plurality of monitoring light receiving elements.

* * * * *